(12) United States Patent
Tung et al.

(10) Patent No.: US 8,438,125 B2
(45) Date of Patent: May 7, 2013

(54) SYSTEM FOR ASSEMBLING BEHAVIOR MODELS OF TECHNOLOGY COMPONENTS

(75) Inventors: Teresa S. Tung, San Jose, CA (US); Nikki Ann G. Guevarra, Chicago, IL (US); Fausto A. Inestroza, San Jose, CA (US)

(73) Assignee: Acenture Global Services Limited (IE)

( * ) Notice: Subject to any disclaimer, the term of this patent is extended or adjusted under 35 U.S.C. 154(b) by 592 days.

(21) Appl. No.: 12/416,752

(22) Filed: Apr. 1, 2009

(65) Prior Publication Data

US 2009/0204382 A1  Aug. 13, 2009

Related U.S. Application Data

(63) Continuation-in-part of application No. 12/030,040, filed on Feb. 12, 2008, now Pat. No. 8,395,621.

(51) Int. Cl.
| | |
|---|---|
| G06F 17/00 | (2006.01) |
| G06F 7/54 | (2006.01) |
| G06F 1/00 | (2006.01) |

(52) U.S. Cl.
USPC .................. 706/45; 703/18; 703/21; 713/340

(58) Field of Classification Search .................. None
See application file for complete search history.

(56) References Cited

U.S. PATENT DOCUMENTS

| | | | |
|---|---|---|---|
| 5,483,656 A | 1/1996 | Oprescu et al. |
| 5,555,195 A | 9/1996 | Jensen et al. |
| 5,852,560 A | 12/1998 | Takeyama et al. |
| 5,960,214 A | 9/1999 | Sharpe et al. |
| 6,490,569 B1 | 12/2002 | Grune et al. |
| 7,333,903 B2 | 2/2008 | Walters et al. |
| 7,386,743 B2 | 6/2008 | Bahali et al. |
| 2002/0004913 A1 | 1/2002 | Fung |
| 2003/0212589 A1 | 11/2003 | Kish |

(Continued)

FOREIGN PATENT DOCUMENTS

| | | |
|---|---|---|
| GB | 2408592 A | 1/2005 |
| JP | 2004 185310 | 7/2004 |
| JP | 2005 182558 A | 7/2005 |
| WO | WO 02/090914 A1 | 11/2002 |

OTHER PUBLICATIONS

Extended European Search Report issued for European Patent Application No. 10003602.9, dated Jul. 26, 2010. 11 pages.

(Continued)

*Primary Examiner* — Alan Chen
(74) *Attorney, Agent, or Firm* — Brinks Hofer Gilson & Lione

(57) ABSTRACT

A system is described for assembling a behavior model of a technology component. The system may include a memory, and a processor. The memory may store a behavior model of a technology component. The processor may to monitor the technology component over a period of time to determine a plurality of parameter values associated with each state of a plurality of states of the technology component. The processor may process the plurality of parameter values associated with each state to determine a baseline parameter value for each state. The processor may assemble the behavior model for the technology component. The behavior model may include each state, the baseline parameter value for each state, and an association between each state and the baseline parameter value for each state. The processor may store the behavior model of the technology component in the memory.

22 Claims, 14 Drawing Sheets

U.S. PATENT DOCUMENTS

| | | | |
|---|---|---|---|
| 2004/0044476 A1 | 3/2004 | Miyamoto et al. | |
| 2004/0049424 A1 | 3/2004 | Murray et al. | |
| 2004/0186927 A1 | 9/2004 | Eryurek et al. | |
| 2005/0102544 A1 | 5/2005 | Brewer et al. | |
| 2005/0144437 A1 | 6/2005 | Ransom et al. | |
| 2005/0231758 A1 | 10/2005 | Reynolds | |
| 2006/0053023 A1 | 3/2006 | Matsunaga et al. | |
| 2006/0123807 A1 | 6/2006 | Sullivan et al. | |
| 2006/0161450 A1 | 7/2006 | Carey et al. | |
| 2006/0184445 A1 | 8/2006 | Sandor et al. | |
| 2007/0005994 A1 | 1/2007 | Bahali et al. | |
| 2007/0010914 A1 | 1/2007 | Johnson et al. | |
| 2007/0027593 A1 | 2/2007 | Shah et al. | |
| 2007/0038388 A1 | 2/2007 | Nojima et al. | |
| 2007/0038501 A1 | 2/2007 | Lee et al. | |
| 2007/0043540 A1 | 2/2007 | Cleland et al. | |
| 2007/0118551 A1 | 5/2007 | Akkiraju et al. | |
| 2007/0174024 A1 | 7/2007 | Rasmussen et al. | |
| 2007/0239317 A1 | 10/2007 | Bogolea et al. | |
| 2007/0245163 A1 | 10/2007 | Lu et al. | |
| 2007/0260896 A1 | 11/2007 | Brundridge et al. | |
| 2007/0300084 A1* | 12/2007 | Goodrum et al. | 713/300 |
| 2008/0028058 A1 | 1/2008 | Shaw et al. | |
| 2008/0201595 A1 | 8/2008 | Kawasaki | |
| 2008/0228865 A1 | 9/2008 | Cruzada | |
| 2008/0313276 A1 | 12/2008 | Abrams et al. | |
| 2009/0204916 A1 | 8/2009 | Benedek et al. | |
| 2009/0307024 A1 | 12/2009 | Edholm et al. | |
| 2009/0307508 A1 | 12/2009 | Curtis et al. | |
| 2010/0292877 A1 | 11/2010 | Lee | |

OTHER PUBLICATIONS

Frost & Sullivan. *Intelligent Middleware*. A Frost & Sullivan White Paper 2008. 18 pages.

EPO Extended International Search Report of the International Searching Authority (the European Patent Office) regarding Application No. EP09002154, dated Dec. 2, 2009, 7 pages.

Herrlin M.K., Khankari K., "Method for Optimizing Equipment Cooling Effectiveness and HVAC Cooling Costs in Telecom and Data Centers", Ashrae Transactions, Jan. 23, 2008, XP002556875 New York, 9 pages.

Herrlin, Magnus K. Ed—Anonymous: "A New Tool for Evaluating and Designing the Thermal Environment in Telecom Central Offices", Annual International Telecommunications Energy Conference, 28$^{th}$, IEEE, PI, Sep. 1, 2006, XP031020275 ISBN: 978-1-4244-0430-8, 5 pages.

http://www.carbonfootprint.com/calculator.aspx, "Carbon Footprint—Calculate, Reduce and Offset—Carbon Footprint Calculator," 12 pages, published at least as of Feb. 11, 2008.

http://www.businessgreen.com/business-green/news/2209241/accenture-launch-calculator, "Accenture Working on Calculator to Track Servers' Embedded Carbon," pp. 1-4, published at least as of Feb. 8, 2008.

http://www.safeclimate.net/calculator, "Climate Change News and Actions by Safeclimate Calculator," 4 pages, published at least as of Feb. 11, 2008.

http://www.bp.com/extendedsectiongenericarticle.do?categoryId=9015627&contentId=7044493 , "Carbon Footprint Calculator Climate change BP," 9 pages, published at least as of Feb. 11, 2008.

http://www.epa.gov/climatechange/emissions/ind_calculator.html, "Individual Emissions Personal Emissions Calculator Climate Change Greenhouse Gas," pp. 1-6, published at least as of Feb. 11, 2008.

http://www.nature.org/initiatives/climatechange/calculator, "Carbon Footprint Calculator Calculate Your Impact on Climate Change," 6 pages, published at least as of Feb. 11, 2008.

"Virtualization," *Wikipedia, the free encyclopedia*, pp. 1-6, http://en.wikipedia.org/wiki/Virtualization, published at least as of Jan. 18, 2008.

http://www.powermeterstore.com/p3865/shark_100s.php, "Shark 100S power meter, wireless," published at least as of May 19, 2008.

Yiyu Chen et al., Managing Server Energy and Operational Costs in Hosting Centers, pp. 303-314, SIGMETRICS, Jun. 6-7, 2005.

EPA, "Emission Facts", Apr. 200, EPA420-F-00-013 pp. 1-3.

Office Action issued in commonly owned U.S. Appl. No. 12/416,744, mailed Jan. 9, 2013.

* cited by examiner

SYSTEM FOR ASSEMBLING BEHAVIOR MODELS OF TECHNOLOGY COMPONENTS

CROSS-REFERENCE TO RELATED APPLICATIONS

This application is a continuation-in-part of U.S. patent application Ser. No. 12/030,040, filed on Feb. 12, 2008, which is incorporated by reference herein.

TECHNICAL FIELD

The present description relates generally to a system and method, generally referred to as a system, for assembling behavior models of technology components, and more particularly, but not exclusively, to assembling behavior models of technology components for monitoring the energy efficiency of an organization's technology components and accurately forecasting the performance of an organization's technology components.

BACKGROUND

The costs and carbon impact of energy use are becoming increasingly important to consumers, organizations and governments. Organizations may be reassessing their energy use in response to impending regulation, high costs, and public perception. The energy required to operate an organization's technology, such as technology used in the workplace, or technology used in a data center, may account for a significant portion of the organization's energy use. For example, the energy costs attributable to a data center can run upwards of one million dollars per month, and the carbon impact of a data center may be significant. Organizations may be able to reduce their energy costs and carbon impact by operating energy efficient technology.

SUMMARY

A system for assembling behavior models of technology components may include a memory, an interface, and a processor. The memory may be connected to the processor and the interface and may store a behavior model of a technology component. The processor may to monitor the technology component over a period of time to determine a plurality of parameter values associated with each state of a plurality of states of the technology component. The processor may process the plurality of parameter values associated with each state to determine a baseline parameter value for each state. The processor may assemble the behavior model for the technology component. The behavior model may include each state, the baseline parameter value for each state, and an association between each state and the baseline parameter value for each state. The processor may store the behavior model of the technology component in the memory.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
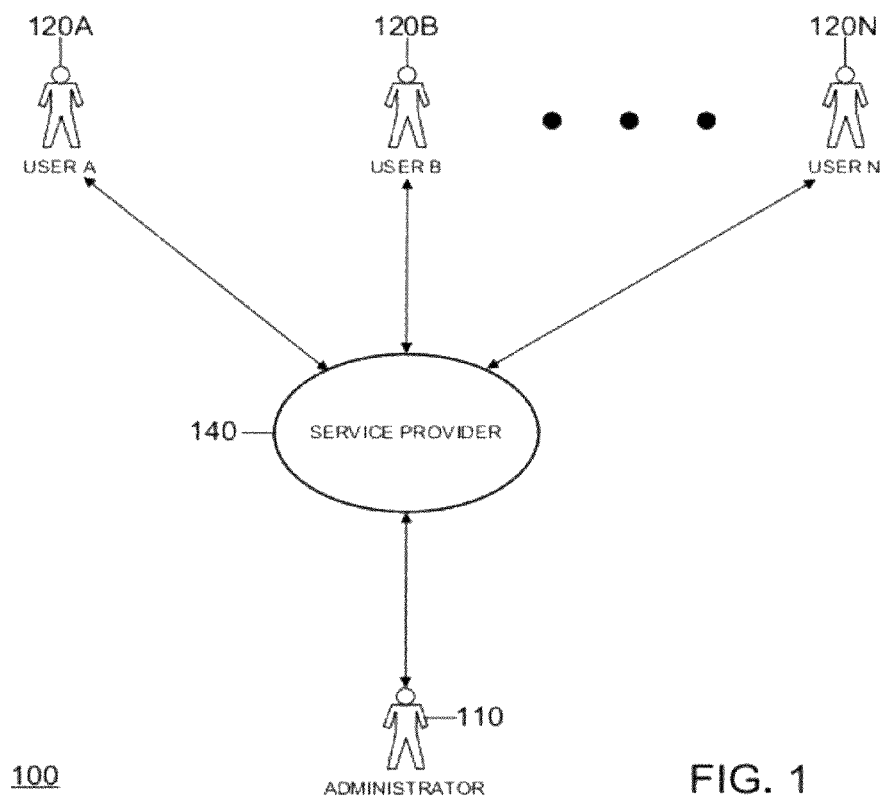
FIG. 1 is a block diagram of a general overview of a system for assembling behavior models of technology components.

A system and method, generally referred to as a system, may relate to assembling behavior models of technology components, and more particularly, but not exclusively, assembling behavior models of technology components for monitoring the energy efficiency of an organization's technology components and accurately forecasting the performance of an organization's technology components. The principles described herein may be embodied in many different forms.

The system may allow a user to monitor technology components in the data centers and/or workplaces of an organization to identify when a technology component, such as a server, a power delivery unit, a cooling unit, a laptop, or generally any technology component used in a data center and/or a workplace, is not operating in an energy efficient manner. The system may monitor the power consumption of each technology component and may compare the power consumption to a baseline power consumption model of each component. The baseline power consumption model may specify the power consumption expected of the technology component. If the power consumption of a technology component is not within a threshold of the power consumption specified in the model, the system alerts the user that the technology component is not operating as expected, i.e. the technology component is operating in an energy inefficient manner. The alert may include information describing possible replacements for the technology component or operational suggestions like turning on a back-up unit.

The system may allow an organization to ensure that they are operating the most energy efficient technology components in the data centers and/or workplaces of the organization. The system may monitor the power consumption of each technology component and may compare the power consumption to an energy efficient power consumption model of the most energy efficient component capable of replacing the technology component. The energy efficient power consumption model may specify the power consumption expected of the most energy efficient technology component. If the power consumption of the technology component is not within a threshold of the power consumption specified in the energy efficient power consumption model, the system alerts a user that a more energy efficient technology component is available. The alert may include information describing the more energy efficient replacement component. The organization may configure the threshold to control the level of energy efficiency advancements which trigger an alert.

Although for the sake of explanation the specification discusses monitoring the energy efficiency of technology components, the system may allow an organization to monitor any measurable parameter of a technology component. The system may allow a user to identify a parameter which can be used to monitor the behavior of a technology component, such as the operating temperature of the technology component. The system may allow the user to assemble a behavior model for the technology component by identifying a baseline value of the parameter for each operating state of the technology component. The operating states may include an offline state, a startup state, and an online state. The system may allow the user to set a threshold which indicates an accepted variance of the baseline parameter value for each operating state of the technology component. The system may monitor the current value of the parameter and the current operating state of the technology component. The system may alert the user when the current value of the parameter is not within the accepted variance of the baseline value of the parameter in the behavior model for the current operating state. The alert may include information describing the amount by which the current value of the parameter deviates from the baseline value of the parameter.

FIG. 1 provides a general overview of a system 100 for assembling behavior models of technology components. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more users 120A-N, a service provider 140, and an administrator 110. The users 120A-N may be responsible for maintaining, upgrading, and/or developing the technology components of an organization. The service provider 140 may provide an application to the users 120A-N which allows the users 120A-N to manage the power consumption of the technology components to ensure the technology components are operating as expected, i.e. in an energy efficient manner. For example, the service provider 140 may provide an application to the users 120A-N which allows the users 120A-N to view the effects of energy saving strategies on the energy consumption of the technology components. An energy saving strategy may be a technology implementation strategy which reduces the energy consumption resulting from the operation of the technology components.

The service provider 140 may also provide an application to the users 120A-N which allows the users 120A-N to assemble baseline power consumption models for each technology component. The baseline power consumption models may describe the expected power consumption of the technology component. The baseline power consumption models may account for the operating state and/or utilization of each technology component. For example, a server operating at eighty percent of its maximum load would be expected to consume more power than the same server operating at forty percent of its maximum load. The baseline power consumption models may be assembled based on actual measured power consumption values of each technology component. The application may also allow the users 120A-N to configure alerts based on the baseline power consumption models, such that the users 120A-N are alerted when the actual power consumption of a technology component is not conforming with the expected power consumption indicated by the technology component's baseline power consumption model.

The administrator 110 may be a person or an automated process, and may be responsible for maintaining a database of technology components, and existing technology configurations. The database of technology components may include the manufacturer rated values for the power consumption of each technology component. The manufacturer values may be used as the default baseline power consumption values until actual power consumption values can be measured. The database of technology components may also include alternative technology components which may be used to replace the technology components of an organization. The baseline power consumption models of the alternative components may be based off of the manufacturer rated values, or may be based off actual values retrieved from of another organization's implementation of the component. The steps of assembling a baseline power consumption model of a technology component are discussed in more detail in FIG. 5 below.

Alternatively or in addition the administrator 110 may be a consultant who provides energy consulting services to one or more clients, such as organizations. The administrator 110 may maintain the data associated with each of the organizations utilizing the consulting services of the administrator 110. The administrator 110 may use the forecasts generated by the system 100 to assist in providing energy consulting services to the organizations. The data associated with the technology components of each of the organizations may be used to refine the power consumption models across all of the organizations.

In operation, the service provider 140 may provide the user A 120A with an interface allowing the user A 120A to provide a profile of their organization's workplaces and/or data centers, and an initial technology configuration of the workplaces and/or data centers. The user A 120A may provide a separate profile and technology configuration of each workplace and/or data center operated by the organization, or the user A 120A may provide an aggregate profile and configuration of all of the workplaces and/or data centers operated by the organization. The profile information may describe the geographic location, the industry, the number of employees, and/or any general characteristics describing the workplaces and/or data centers.

The initial configuration of a workplace and/or data center may include information describing the inventory of information technology ("IT") components of the workplace and/or data center. The inventory of technology components in a workplace may include laptops, monitors, desktops, printers, thin clients, network devices, or generally any technology utilized in the workplace. The inventory of technology components in a data center may include the computing components that provide computing capabilities, such as server components and storage components. Alternatively or in addition the inventory of technology components in a workplace and/or data center may include support components which support the proper functioning of the computing components, such as lighting systems, cooling delivery, power delivery, or generally any component which supports the data center or the workplace. The user A 120A may provide specific information describing the technology components, such as the specific models, or may provide a more general description of the technology components, such as a "high-end" server.

The system 100 may include a database of pre-filled technology component information, which the user A 120A may be able to browse or search. The technology component information may include specific data describing each component, such as the make and model of the component, the baseline power consumption model of the component, the annual operating cost of the component, or generally any data describing a technology component. The administrator 110 may maintain the database and may update the database as new information regarding technology components becomes available. The administrator 110 may manually update the database or the database may be automatically updated by a data feed. The baseline power consumption model of a technology component may initially utilize the power consumption values provided by the manufacturer, but may be refined by measuring the actual power consumption values of the technology component. The actual power consumption values may be shared across all of the organizations. Alternatively or in addition an organization may only have access to the power consumption values measured from the organization's technology components.

Once the user A 120A has provided the technology configurations of the organization, the user A 120A may begin to develop one or more energy saving strategies for each workplace and/or data center. The strategies may represent one or more methods for reducing the energy consumption of the workplaces and/or data centers. For example, a strategy may relate to transitioning the organization's technology components to more energy efficient alternatives. In this example, the strategy may provide the user A 120A with guidance on the rate at which new equipment should be acquired, and the type of equipment to acquire, to minimize the overall energy consumption of the organization. The service provider 140 may provide an application to the user A 120A which allows the user to view the forecasted effects of each strategy on the overall energy consumption of the organization, such as on a graph. The forecasts may utilize the baseline power consumption models for each technology component to forecast the overall energy consumption of the organization.

The forecasts may also allow the user A 120A to view the effects of the strategy on other variables associated with the operation of the technology components, such as electricity costs and carbon emissions. In order to accurately measure the effects of the strategy on the electricity costs and carbon emissions, the user A 120A may provide estimates for the changes in electricity costs over time, and change in the amount of carbon generated per kilowatt-hour of energy consumed over time. The system 100 may apply the estimates provided by the user A 120A to the strategies identified by the user A 120A. The system 100 may generate one or more graphs demonstrating the effects of the estimates on the operating and environmental costs associated with operating the organization over a period of time utilizing the baseline power consumption models of each technology component. The user A 120A may use the information provided in the graphs to further refine the strategies of their workplaces and or data centers. The steps of developing multiple waves of energy saving strategies are discussed in more detail in FIG. 8 below.

The service provider 140 may automatically analyze the technology configurations identified by the user A 120A to determine whether the technology configurations may be modified to increase the energy and/or cost saving efficiencies. The system 100 may recommend modifications to the configurations which may result in more efficient energy use by the organization. For example, the service provider 140 may determine whether any of the technology components may be replaced with a more energy efficient technology component based on the baseline power consumption models of the components. The steps of determining whether the technology configurations may be modified are discussed in more detail in FIG. 9 below.

The service provider 140 may also monitor the real-time power consumption and utilization of the organization's technology components. The power consumption and utilization of each technology component may be compared against the baseline power consumption model of the component. If the real-time power consumption of a technology component is not within a threshold of the power consumption indicated in the baseline power consumption model, the service provider 140 may alert the user A 120A that the technology component should be replaced. The steps of monitoring the power consumption of a technology component are discussed in more detail in FIG. 4 below.

The service provider 140 may provide the user A 120A with an interface for creating the threshold. The threshold may identify an acceptable power consumption range based on the baseline power consumption model of each technology component. If the measured energy consumption of the technology component is within the range specified by the threshold, then the technology component is considered to be operating as expected. If the power consumption of the technology component is not operating within the range specified by the threshold, then the user A 120A is alerted that the technology component should be replaced or that preventative operations should be triggered. For example, the user A 120A may specify that a measured power consumption value within ten percent of the baseline power consumption values is considered acceptable. Alternatively or in addition, the user A 120A may specify one threshold that is applied across all of the technology components. The service provider 140 may use a default value of ten percent until the user A 120A identifies a threshold. The steps of determining whether a technology component is operating in an energy efficient manner are discussed in more detail in FIG. 6 below.

Alternatively or in addition, instead of using the baseline power consumption model of the particular technology component implemented by the organization, the service provider 140 may use an energy efficient power consumption model associated with the most energy efficient technology component which performs the same task as the technology component implemented by the organization. The most energy efficient technology component may be based on the measured power consumption values for similar technology components across all organizations. Alternatively or in addition the service provider 140 may retrieve power consumption models of additional technology components from third party sources, such as manufacturer or retailer databases. Alternatively or in addition the administrator 110 may input power consumption models for additional technology components. Using the energy efficient power consumption model allows an organization to ensure their data centers and/or workplaces are operating in the most energy efficient manner possible, instead of operating in the most energy efficient manner achievable by their particular technology configuration.

Figure 2:
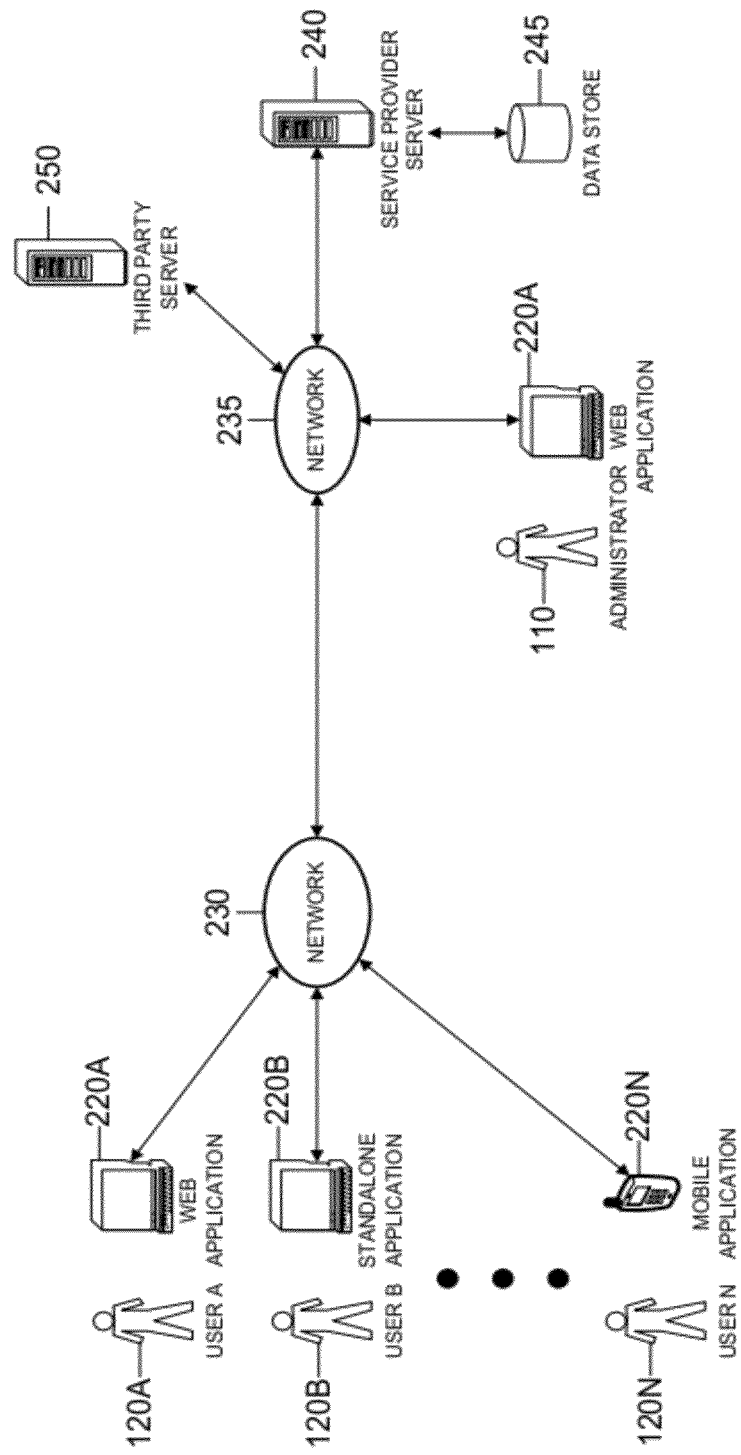
FIG. 2 is a block diagram of a network environment implementing the system of FIG. 1 or other systems for assembling behavior models of technology components.

FIG. 2 provides a simplified view of a network environment 200 implementing the system of FIG. 1 or other systems for assembling behavior models of technology components. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more users 120A-N, an administrator 110, a service provider server 240, a third party server 250, a data store 245, networks 230, 235, and one or more web applications, standalone applications, mobile applications 220A-N, which may collectively be referred to as client applications.

Some or all of the service provider server 240 and the third party server 250 may be in communication with each other by way of network 235. The administrator 110 may use a web application 220A to interface with the service provider server 240 and maintain the database of technology components and technology configurations stored in the data store 245. Alternatively or in addition, the administrator 110 may use a mobile application 220N or a standalone application 220B to interface with the service provider server 240.

The networks 230, 235 may include wide area networks (WAN), such as the Internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The web applications, standalone applications and mobile applications 220A-N may be connected to the network 230 in any configuration that supports data transfer. This may include a data connection to the network 230 that may be wired or wireless. Any of the web applications, standalone applications and mobile applications 220A-N may individually be referred to as a client application. The web application 220A may run on any platform that supports web content, such as a web browser or a computer, a mobile phone, personal digital assistant (PDA), pager, network-enabled television, digital video recorder, such as TIVO®, automobile and/or any appliance or platform capable of data communications. The web application 220A may support a rich internet application implemented with the ADOBE FLEX® technologies. Alternatively or in addition the web application 220A may be developed using one or more of the following technologies: ADOBE FLEXBUILDER 3®, ADOBE FLEX SUBCLIPSE®, or generally any web development technologies.

The standalone application 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the networks 230, 235 with the service provider server 240. The standalone application 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, ADOBE FLEX®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data. For example, the mobile application 220N may be an application running on an APPLE IPHONE®.

The service provider server 240 may include one or more of the following: an application server, a mobile application server, a data store, a database server, and a middleware server. The service provider server 240 may exist on one machine or may be running in a distributed configuration on one or more machines.

Figure 14:
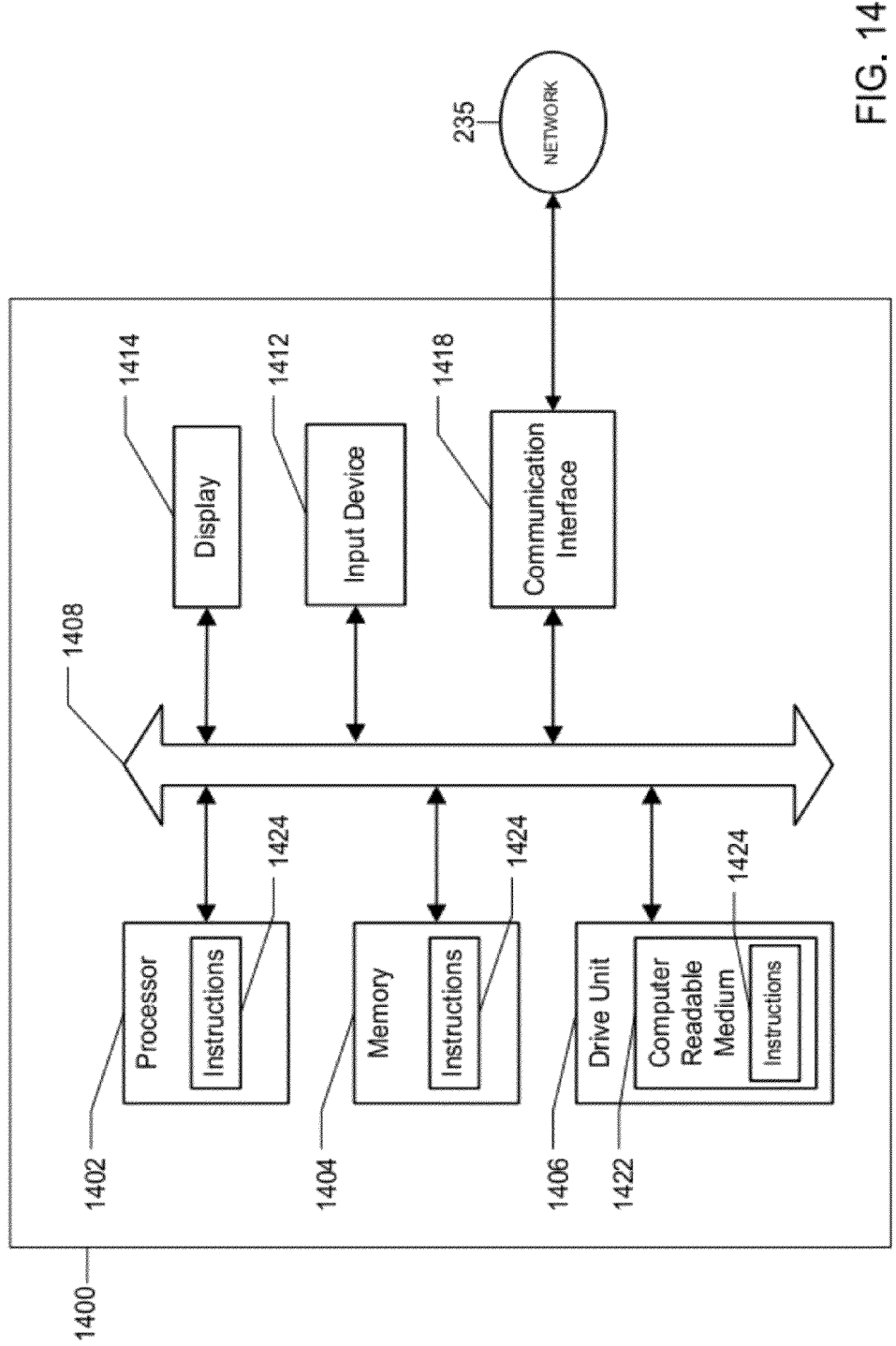
FIG. 14 is an illustration of a general computer system that may be used in the systems of FIG. 2, and FIG. 3, or other systems for assembling behavior models of technology components.

The service provider server 240 and client applications 220A-N may be one or more computing devices of various kinds, such as the computing device in FIG. 14. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 220A may employ the Hypertext Transfer Protocol ("HTTP") to request information, such as a web page, from a web server, which may be a process executing on the service provider server 240.

There may be several configurations of database servers, application servers, mobile application servers, and middleware applications included in the service provider server 240. The data store 245 may be part of the service provider server 240 and may be a database server, such as MICROSOFT SQL SERVER®, ORACLE®, IBM DB2®, SQLITE®, or any other database software, relational or otherwise. The data store 245 may store the technology component information, including the power consumption models for each technology component, and the technology configuration information of the data centers and/or workplaces. The application server may be APACHE TOMCAT®, MICROSOFT IIS®, ADOBE COLDFUSION®, or any other application server that supports communication protocols. The middleware application may be any middleware that provides additional functionality between the application server and the clients 220A-N, such as a PHP: HYPERTEXT PREPROCESSOR ("PHP"), or a PYTHON framework, such as a DJANGO framework.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation, the user A 120A may access the service provided by the service provider server 240 through the web application 220A and the network 230. The web application 220A may download a client side application from the service provider server 240, such as by using ADOBE FLASH® PLAYER 9. The web application 220A may request data from the middleware application, such as a PHP server. The PHP server may query the information from the data store 245 and communicate the information to the web application 220A. The user A 120A may interact with the client side application through the web application 220A. The data may be passed between the web application 220A and the database 245 via the PHP server. The majority of the calculations may be performed on the service provider server 240, although some calculations may be completed on the web application 220A in order to speed up response times.

Alternatively or in addition the client applications 220A-N may be able to function in both an online and an offline mode. The client applications 220A-N may include a locally cached data store for offline operations. The local and remote data store may synchronize when online operations are available. In one example the service provider server 240 may use ADOBE AIR® to implement the online and offline functionality.

Figure 3:
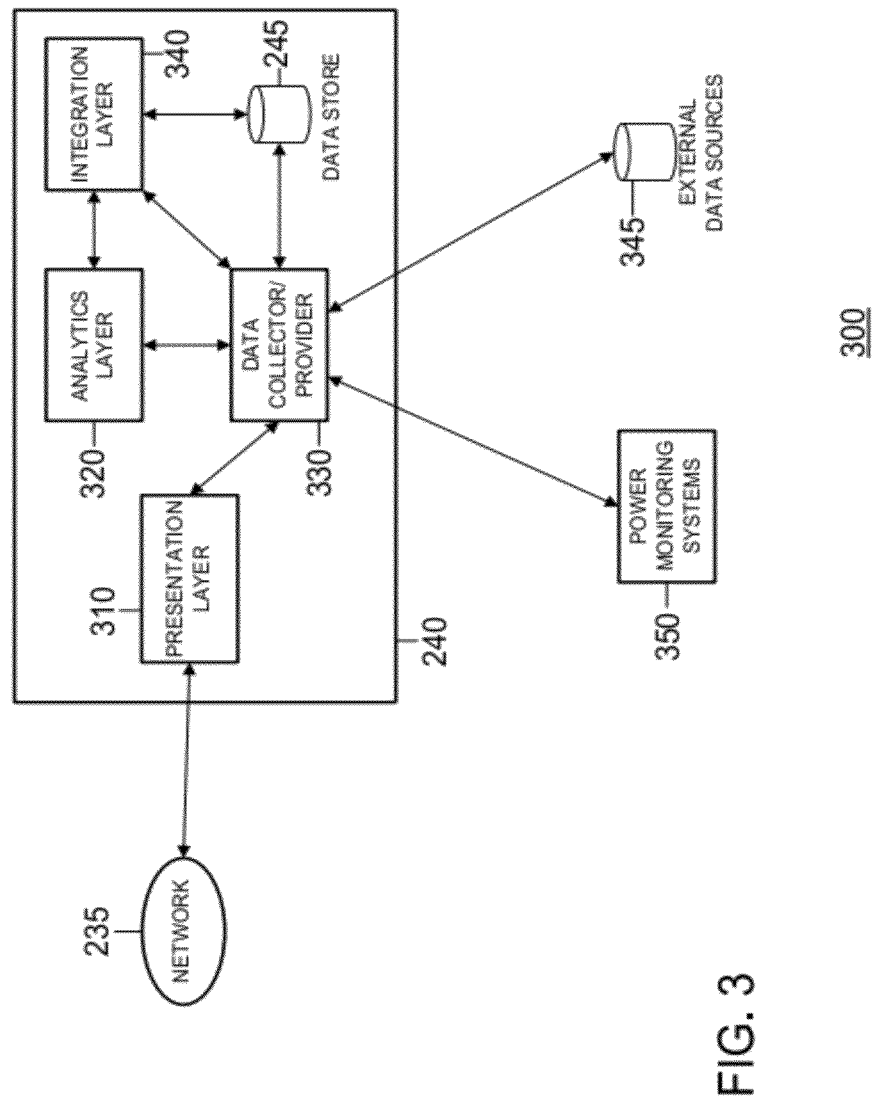
FIG. 3 is a block diagram of an exemplary server side architecture implementing the system of FIG. 1 or other systems for assembling behavior models of technology components.

FIG. 3 provides a simplified view of exemplary server side architecture 300 of the service provider server 240, or other servers implementing the system of FIG. 1 or other systems for assembling behavior models of technology components. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The server side architecture 300 may include a service provider server 240, power monitoring systems 350, external data sources 345, and the network 235. The service provider server 240 may include a presentation layer 310, an analytics layer 320, a data collector/provider 330, an integration layer 340, and a data store 245.

The external data sources 345 may provide technology component information and/or technology configuration information to the service provider server 240 via the data collector/provider 330. The technology component information may then be stored in the data store 245. The technology component information may include any data describing the technology components, such as the power consumption models of the technology components. The technology configuration information may describe any existing or past technology configurations of the organization. Alternatively or in addition the technology configuration information may describe the technology configuration of other organizations. The data collector/provider 330 may also be used to receive any other data relevant to the system 100, such as real-time information on electricity prices, or the amount of carbon generated carbon per kWh of energy consumed, or historical and forecast weather information. The external data sources 345 may be Internet based, such as the third party server 250 of FIG. 2.

The real-time energy consumption of the workplaces and/or data centers of the organization may be received from the power monitoring systems 350. The power monitoring systems 350 may also be third party servers 250 and may provide real-time visibility into electricity consumption of each technology component of the workplace and/or data centers. For example, the technology components in the workplaces and/or data centers may be attached to network connected energy meters, such as the EIG SHARK 100-S ELECTRONIC SUB-METER. The energy meters may be capable of transmitting energy consumption data over the network 235 to the power monitoring system 350, or directly to the service provider server 240. The analytics layer 320 may be an application used to perform advanced modeling, statistics, and mathematics calculations. The analytics layer 320 may allow for more sophisticated analytics to be applied with the application.

The integration layer 340 may allow the system 100 to share data with other energy forecasting applications running on the service provider server 240. For example, the integration layer 340 may allow the system 100 to share the baseline power consumption models for each technology component with any of the systems described in the parent patent application, or described in commonly assigned U.S. patent application Ser. No. 12/144,910, filed on Jun. 24, 2008, entitled "SYSTEM FOR ASSEMBLING BEHAVIOR MODELS OF TECHNOLOGY COMPONENTS," by Zsolt Benedek et al., the contents of which are hereby incorporated by reference. The baseline power consumption models of the technology components may allow these systems to utilize actual measured power consumption values for the technology components.

Figure 4:
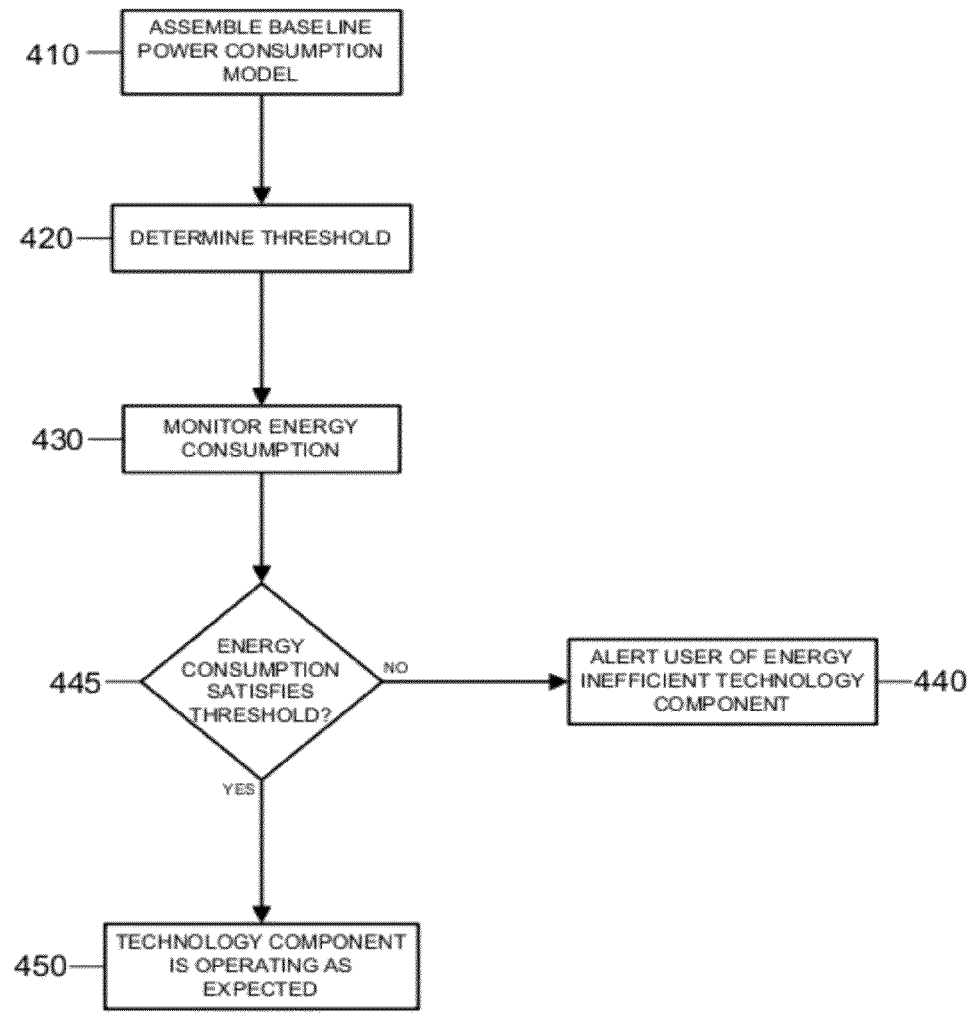
FIG. 4 is a flowchart illustrating the steps of monitoring the energy efficiency of a technology component in the system of FIG. 1, or other systems for assembling behavior models of technology components.

FIG. 4 is a flowchart illustrating the steps of monitoring the energy efficiency of a technology component in the system of FIG. 1, or other systems for assembling behavior models of technology components. The steps of FIG. 4 are described as being performed by the service provider server 240. However, the steps may be performed by a process running on the operating system of the service provider server 240, by the processor of the service provider server 240, or by any other hardware component of the service provider server 240. Alternatively the steps may be performed by an external hardware component or software process.

At step 410, the service provider server 240 may assemble a baseline power consumption model for a technology component. The baseline power consumption model may describe the expected power consumption of the technology component. The baseline power consumption model may include the power consumed by the technology component when operating in various states, such as when operating in an offline state, an online state, and/or a startup state. If the utilization of the technology component can also be monitored, the power consumption model may also incorporate the utilization of the technology component. For example, the amount of power consumed by a server may depend on the utilization of the server. A server operating at a higher utilization may consume more power than a server operating at a lower utilization. Thus, the baseline power consumption of the server may also differ depending on the utilization of the server. The steps of assembling a power consumption model for a technology component may be discussed in more detail in FIG. 5 below.

At step 420, the service provider server 240 may determine a threshold for the technology component. The threshold may indicate the acceptable power consumption range in which the technology component must operate within to be considered energy efficient. The threshold may be a percentage of the values provided by the baseline power consumption model. For example, the threshold may be ten percent of the baseline power consumption values. In this example, if the baseline power consumption value for a technology component is one hundred kilowatts, then the acceptable power consumption range may be ninety kilowatts to one hundred and ten kilowatts. The steps of determining a threshold for a technology component are discussed in more detail in FIG. 6 below.

At step 430, the service provider server 240 may monitor the energy consumption of the technology component. The service provider server 240 may monitor the energy consumption directly, or the service provider server 240 may receive information describing the energy consumed from the power monitoring systems 350. For example, the service provider server 240 may be in communication, such as via the network 235, with a meter measuring the power consumption of the technology component. The service provider 240 may also monitor the current state of the technology component. The service provider server 240 may monitor the state of the technology component directly, such as through a management console, or the service provider server 240 may receive information describing the state of the technology component from an external source, such as the power monitoring systems 350.

At step 445, the service provider server 240 may determine whether the energy consumption of the technology component in its current state satisfies the threshold for the technology component. For example, if the technology component is in the offline state, the service provider server 240 may use the baseline power consumption model to retrieve the baseline power consumption value for the technology component when operating in the offline state. The service provider server 240 may then determine if the current energy consumption of the technology component is within the threshold of the baseline power consumption value provided by the baseline power consumption model for the current state. The steps of determining if the current energy consumption of the technology component satisfies the threshold may be discussed in more detail in FIG. 6 below.

If, at step 445, the service provider server 240 determines that the energy consumption of the technology component satisfies the threshold, the service provider server 240 moves to step 450. At step 450, the service provider server 240 identifies that the technology component is operating as expected. If, at step 445, the service provider server 240 determines that the energy consumption of the technology component does not satisfy the threshold, the service provider server 240 moves to step 440.

At step 440, the service provider server 240 alerts the user A 120A that the technology component is not operating as expected, i.e. the technology component is operating in an energy inefficient manner. For example, the service provider server 240 may send a short message service (SMS) message, also referred to as a text message, to a device of the user A 120A alerting the user A 120A of the technology component operating in a energy inefficient manner. Alternatively or in addition, the service provider server 240 may send an email, an instant message, or generally any form of communicating to a device of the user A 120A to alert the user A 120A of the technology component which is operating in an energy inefficient manner. The notification of this event may also automatically trigger preventative measures such as turning on back-up systems. The steps of alerting the user A 120A of a technology component operating in an energy inefficient manner may be discussed in more detail in FIG. 7 below.

Figure 5:
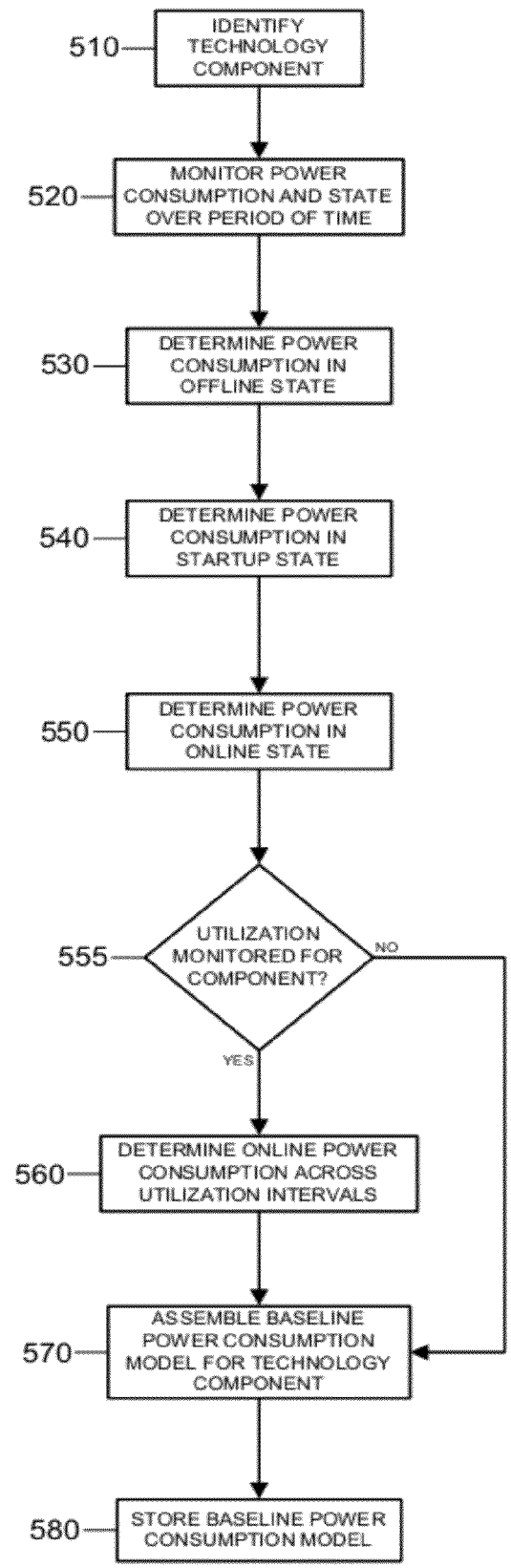
FIG. 5 is a flowchart illustrating the steps of assembling a baseline power consumption model of a technology component in the system of FIG. 1, or other systems for assembling behavior models of technology components.

FIG. 5 is a flowchart illustrating the steps of assembling a baseline power consumption model of a technology component in the system of FIG. 1, or other systems for assembling behavior models of technology components. The steps of FIG. 5 are described as being performed by the service provider server 240. However, the steps may be performed by a process running on the operating system of the service provider server 240, by the processor of the service provider server 240, or by any other hardware component of the service provider server 240. Alternatively the steps may be performed by an external hardware component or software process.

At step 510, the service provider server 240 identifies a technology component to utilize to assemble a baseline power consumption model. An unused technology component may be best suited for assembling a baseline power consumption model since the age of the technology component may effect the power consumption of the technology component. In this case, the technology component may be set to the desired state and/or utilization and the power consumption may be monitored for a period of time. Alternatively or in addition, the service provider server 240 may automatically assemble a baseline power consumption model for each technology component of the organization, such as when the technology component is first added to the technology configuration of the organization. However, in many cases the baseline power consumption model may be assembled based on a technology component currently in operation in a data center and/or workplace.

At step 520, the service provider server 240 may monitor the power consumption and state of the technology component over a period of time, such as one week. The service provider server 240 may monitor the power consumption and the state of the technology component directly, or the service provider server 240 may receive data describing the power consumption and state, such as from the power monitoring systems 350. The service provider server 240 may monitor the power consumption and the state of the technology component on a periodic basis over the period of time, such as every millisecond. For example, the service provider server 240 may record the current power consumption and the state of the technology component every millisecond. The states of the technology component may describe operations of the technology component which may require differing levels of power consumption. For example, a technology component may have an offline state which refers to the technology component operating in a powered down, or low-power mode, an online state which refers to the technology component operating in a normal state, a startup state which refers to the transition of the technology component from the offline state to the online state, or generally any state which may describe an operation of the technology component. In the case of a technology component which can be measured in terms of utilization, such as a server, the service provider server 240 may also monitor the utilization of the technology component.

At step 530, the service provider server 240 may determine the power consumption of the technology component over the period of time while the technology component was operating in an offline state. For example, the service provider server 240 may determine the average of all of the power consumption measurements for the technology component over the period of time while the technology component was operating in the offline state. The service provider server 240 may determine a smoothed average of the power consumption measurements by using the following equation: avg=γy+(1−γ)Y, where Y refers to the previous average, y refers to the current value, and γ is a value between 0 and 1 randomly chosen by the service provider server 240. For example, when γ is a value near 1 the most recent measurements are more heavily weighed, and a γ value near 0 weighs the historical observations greater. A variance $\sigma^2$ of the values used in the average may also be determined, as the average is determined, by using the following equation $\sigma^2=\phi(y-Y)^2+(1-\phi)V$, where Y represents the average, y represents the current measured value of the power consumption (the same value used in computing the smoothed average), V represents the previous variance, and φ represents a value between 0 and 1 randomly selected by the service provider server 240. For example, setting φ to a value close to 0 or 1 weighs more recent or past measurements respectively. The variance may also be stored in the baseline power consumption model. Alternatively or in addition, instead of determining the average power consumption the service provider server 240 may use the maximum power consumption value measured for the technology component operating in the offline state over the period of time.

At step 540, the service provider server 240 may determine the power consumption of the technology component over the period of time while the technology component was operating in a startup state. The service provider server 240 may also record the amount of time the technology component was operating in the startup state, i.e. the amount of time required for the technology component to transition from the offline state to the online state. For example, the service provider server 240 may determine the average of all of the power consumption measurements for the technology component over the period of time while the technology component was operating in the startup state and the average of the startup times. The service provider server 240 may determine a smoothed average of the power consumption and startup time measurements by using the following equation: avg=γy+(1−γ)Y, where Y refers to the previous average, y refers to the current value, and γ is a value between 0 and 1 randomly chosen by the service provider server 240. For example, when γ is a value near 1 the most recent measurements are more heavily weighed, and a γ value near 0 weighs the historical observations greater. A variance $\sigma^2$ of the values used in the average may also be determined, as the average is determined, by using the following equation $\sigma^2=\phi(y-Y)^2+(1-\phi)V$, where Y represents the average, y represents the current measured value of the power consumption (the same value used in computing the smoothed average), V represents the previous variance, and φ represents a value between 0 and 1 randomly selected by the service provider server 240. For example, setting φ to a value close to 0 or 1 weighs more recent or past measurements respectively. The variance may also be stored in the baseline power consumption model. Alternatively or in addition, instead of determining the averages, the service provider server 240 may use the maximum power consumption value and/or maximum startup time measured for the technology component operating in the startup state over the period of time.

At step 550, the service provider server 240 may determine the power consumption of the technology component over the period of time while the technology component was operating in an online state. For example, the service provider server 240 may determine the average of all of the power consumption measurements for the technology component over the period of time while the technology component was operating in the online state. The service provider server 240 may determine a smoothed average of the power consumption measurements by using the following equation: avg=γy+(1−γ)Y, where Y refers to the previous average, y refers to the current value, and γ is a value between 0 and 1 randomly chosen by the service provider server 240. For example, when γ is a value near 1 the most recent measurements are more heavily weighed, and a γ value near 0 weighs the historical observations greater. A variance $\sigma^2$ of the values used in the average may also be determined, as the average is determined, by using the following equation $\sigma^2=\phi(y-Y)^2+(1-\phi)V$, where Y represents the average, y represents the current measured value of the power consumption (the same value used in computing the smoothed average), V represents the previous variance, and φ represents a value between 0 and 1 randomly selected by the service provider server 240. For example, setting φ to a value close to 0 or 1 weighs more recent or past measurements respectively. The variance may also be stored in the baseline power consumption model. Alternatively or in addition, instead of determining the average, the service provider server 240 may use the maximum power consumption value measured for the technology component operating in the online state over the period of time.

At step 555, the service provider server 240 may determine whether utilization values were monitored for the technology component, such as at step 520. For example, certain technology components, such as servers, may be associated with utilization values which may be monitored by the service provider server 240. The utilization values may further describe the baseline power consumption values of the technology component operating in the online state. For example, the utilization of a server may refer to the percentage of memory or central processing unit (CPU) resources currently used by the server. In another example, the utilization of a cooling unit may refer to the fractions of tons of cooling delivered over maximum capacity for the heating, ventilating and air conditioning (HVAC) system, or the utilization may refer to the current fan speed divided by the maximum fan speed. In another example, the utilization of power delivery components, such as an uninterruptible power supply (UPS) and power delivery units (PDU), may refer to the fraction of the power delivered by the component divided by the power capacity of the component.

If, at step 555, the service provider 240 determines that utilization values were monitored for the technology component, the service provider server 240 moves to step 560. At step 560, the service provider server 240 determines the power consumption of the technology component at varying intervals of the utilization values. For example, if the utilization is measured as a percentage, the service provider server 240 may determine the power consumption of the technology component at ten percent intervals. Thus, the service provider server 240 may determine the power consumption of the technology component operating at ten percent utilization, twenty percent utilization, etc. The service provider server 240 may determine the average of all of the power consumption measurements for the technology component over the period of time while the technology component was operating at each identified utilization interval. The service provider server 240 may determine a smoothed average of the power consumption measurements for each utilization interval by using the following equation: avg=γy+(1−γ)Y, where Y refers to the previous average, y refers to the current value, and γ is a value between 0 and 1 randomly chosen by the service provider server 240. For example, when γ is a value near 1 the most recent measurements are more heavily weighed, and a γ value near 0 weighs the historical observations greater. A variance $\sigma^2$ of the values used in the average may also be determined, as the average is determined, by using the following equation $\sigma^2 = \phi(y-Y)^2 + (1-\phi)V$, where Y represents the average, y represents the current measured value of the power consumption (the same value used in computing the smoothed average), V represents the previous variance, and ϕ represents a value between 0 and 1 randomly selected by the service provider server 240. For example, setting ϕ to a value close to 0 or 1 weighs more recent or past measurements respectively. The variance may also be stored in the baseline power consumption model. Alternatively or in addition, instead of determining the averages, the service provider server 240 may use the maximum power consumption value measured for the technology component operating at each utilization level over the period of time.

If, at step 555, the service provider server 240 determines that utilization values were not monitored for the technology component, the service provider server 240 moves to step 570. At step 570, the service provider server 240 assembles the baseline power consumption model for the technology component. The baseline power consumption model may receive the state of a technology component as an input and may provide the baseline power consumption of the technology component operating in the inputted state. In the case of a technology component with a utilization capable of being monitored, the baseline power consumption model may also receive a utilization value as an input and may provide the baseline power consumption value of the technology component operating at the inputted utilization as an output.

For example, the baseline power consumption model may map each operating state with the determined baseline power consumptions for the operating state. In the case of a technology component associated with a utilization capable of being monitored, the model may map the online state, and a utilization value, to the determined baseline power consumption value for the utilization. The model may also utilize curve fitting algorithms, such as a Gauss-Newton algorithm or a linear least square method, to form a continuous representation of the baseline power consumption as a function of utilization. The shape of the continuous function may vary based on the component. For example, a linear type may be used for computing components, such as servers, and a non-linear type may be used for support components, such as PDUs or HVAC systems.

In the case of the computing components, the service provider server 240 may apply the measured utilization and power values to the following equation where PC refers to the power consumption and U refers to the utilization: PC=aU+b. The linear least squares method may be used to solve for a and b. Once a and b are determined, the baseline power consumption value can be calculated for any given utilization.

In the case of the support components, the service provider server 240 may apply the measured utilization and power values to the following equation where PC refers to the power consumption and U refers to the utilization:

$$PC = \frac{aU}{b+U}.$$

The Gauss-Newton algorithm can be used to solve for a and b. Once a and b are determined, the baseline power consumption value can be calculated for any given utilization.

At step 580, the service provider server 240 may store the baseline power consumption model for the technology component in the data store 245. The service provider server 240 may also store an association between the technology component and the baseline power consumption model in the data store 245.

Figure 6:
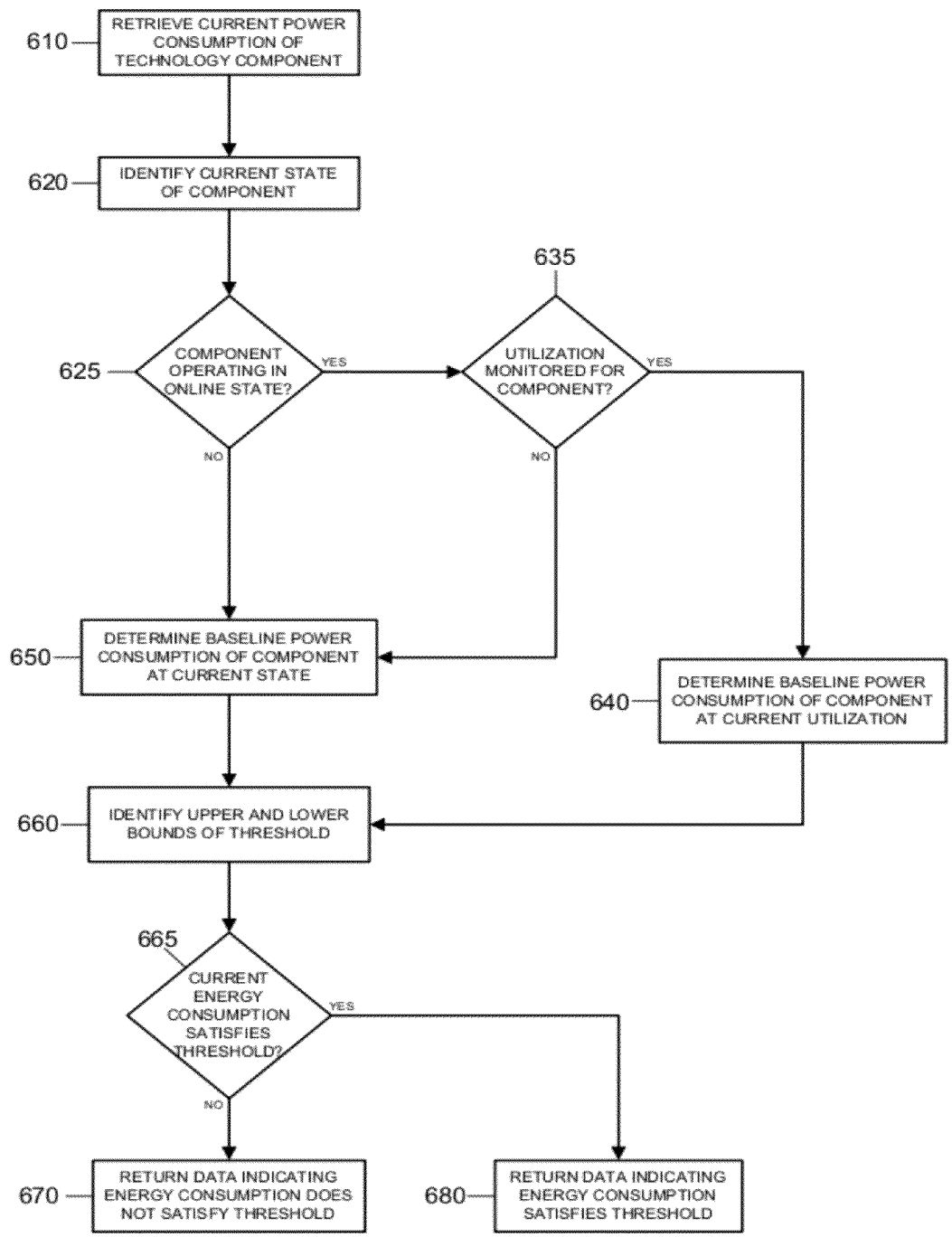
FIG. 6 is a flowchart illustrating the steps of determining whether a technology component is operating in an energy efficient manner in the system of FIG. 1, or other systems for assembling behavior models of technology components.

FIG. 6 is a flowchart illustrating the steps of determining whether a technology component is operating in an energy efficient manner in the system of FIG. 1, or other systems for assembling behavior models of technology components. The steps of FIG. 6 are described as being performed by the service provider server 240. However, the steps may be performed by a process running on the operating system of the service provider server 240, by the processor of the service provider server 240, or by any other hardware component of the service provider server 240. Alternatively the steps may be performed by an external hardware component or software process.

At step 610, the service provider server 240 may retrieve the current power consumption value of a technology component. For example, the service provider server 240 may measure the power consumption value of a technology component directly, or the service provider server 240 may receive the current power consumption value from the power monitoring systems 350, or an external source. At step 620, the service provider server 240 may identify the current operating state of the technology component. The service provider server 240 may monitor the operating state of the technology component directly, or the operating state of the technology component may be monitored by the power monitoring systems 350, or an external source.

At step 625, the service provider server 240 determines whether the component is operating in the online state. If the component is operating in the online state, the service provider server 240 moves to step 635. At step 635, the service provider server 240 determines whether utilization values are monitored for the technology component. If, at step 635, the service provider server 240 determines that the utilization values of the technology component are being monitored, the service provider server 240 moves to step 640. At step 640, the service provider server 240 determines the baseline power consumption value of the technology component at the current utilization value. The baseline power consumption value of the technology component may be determined by inputting the current utilization value of the technology component into the baseline power consumption model for the technology component.

If, at step 625, the service provider server 240 determines that the technology component is not operating in the online state, the service provider server 240 moves to step 650. If, at step 635, the service provider server 240 determines that the utilization values of the technology component are not monitored, the service provider server 240 moves to step 650. At step 650, the service provider server 240 determines the baseline power consumption value of the technology component operating in the current state. The service provider 240 may determine the baseline power consumption value by inputting the current state into the baseline power consumption model for the technology component.

At step 660, the service provider server 660 determines the upper and lower bounds of the threshold. The upper and lower bounds of the threshold may describe the acceptable range of power consumption values around the baseline power consumption value. For example, the user A 120A may provide a percentage threshold, such as ten percent. In this case, the upper bound of the threshold would be one hundred and ten percent of the baseline power consumption value and the lower bound of the threshold would be ninety percent of the baseline power consumption value.

Alternatively or in addition, the service provider server 240 may utilize a confidence value in determining the upper and lower bounds of the threshold. The confidence value may be used to choose the upper and lower bounds of the threshold such that the current power consumption value being outside of the threshold is bounded by the confidence value, such as a percentage value of ninety percent, ninety-five percent, etc. The confidence values may trade off the likelihood of not alerting the user A 120A of a technology component operating in an energy inefficient manner when the confidence value is set too low, such as close to zero percent, against the likelihood of mistakenly identifying a technology component as operating in an energy inefficient manner when the confidence value is set too high, such as towards one hundred percent.

For example, if the confidence value is set to ten percent, the upper and lower bounds may be determined such that any measured power consumption value will only have a ten percent chance of not being within the upper and lower bounds. Since only one out of ten measured values may fall outside of the upper and lower bounds, there may be a possibility that the user A 120A is not alerted to a technology component operating in an energy inefficient manner. Alternatively, if the confidence value is set to ninety percent, then any monitored power consumption value will have a ninety percent chance of not being within the upper and lower bounds. In this case, because ninety percent of the monitored power consumption values will fall outside of the bounds, the user A 120A may mistakenly be alerted of a technology component when the technology component is actually operating as expected.

The user A 120A may choose a confidence value for each technology component depending upon the importance of the technology component. For example, if a technology component is critical to the operation of a data center and/or workplace, the user A 120A may set the confidence value high, such as ninety percent. The user A 120A may prefer to mistakenly receive an alert of a technology component operating as expected rather than potentially not receiving an alert of a technology component operating in an energy inefficient manner.

The confidence value P provided by the user A 120A may be used with the baseline power consumption value y, and the variance $\sigma^2$ associated with the baseline power consumption value (as determined in FIG. 6 above) in the following equations to determine the lower bound A and the upper bound B of the threshold.

Markov's inequality may be used to determine the upper bound B of the threshold when the lower bound A is not needed, or can be set to zero. For example, it may be critical that power consumption of a technology component does not a certain threshold to avoid over-heating the technology component or over-burdening the power grid. In this example, the lower bound A may be set to and the upper bound B may be set to y/P. By setting A to 0 and B to y/P, applying Markov's inequality would result in bounding the probability Pr(y'≧B)≦P, which indicates that the probability of any measured power consumption value y' being greater than or equal to the upper bound B is less than or equal to the probability P identified by the user A 120A.

Chebyshev's inequality may be used to determine the lower bound A and the upper bound B. Chebyshev's inequality states that $$Pr(-\alpha \leq y' - y \leq \alpha) \leq \frac{\sigma^2}{\alpha^2}$$

where for some α>0. The lower bound A may be set to A=y−σ√P and the upper bound B may be set to B=y+σ√P. By setting A and B as described, Chebyshev's inequality bounds the probability Pr(A≦y'≦B)≦P, which indicates that the probability of any measured power consumption value y' being within the bounds of A and B is less than or equal to the probability P identified by the user A 120A.

The Central Limit Theorem may be used to determine the lower bound A, and the upper bound B, of the threshold. The theorem states that $$Z := \frac{(y' - Ny)^2}{\sigma\sqrt{N}}$$

follows a standard normal (or Gaussian) distribution with a mean of 0 and a variance of 1, where N represents the number of measured power consumption values used to determine y, and Z represents the standard normal. Using the distribution function of the standard normal random variable: Pr(−β≦Z≦β)≈Φ(β)−Φ(−β)=2Φ(β)−1, where Φ( ) represents the distribution function of the standard normal and can be determined numerically, and β is set such that P=2Φ(β)−1. The lower bound A can be set to A=Ny−βσ√N, where N represents the number of values used to calculate y, and the upper bound B can be set to B=Ny+βσ√N. These values of A and B applied to the Central Limit Theorem imply Pr(A≦y'≦B)≦P, which indicates the probability of any measured power consumption value y' being within the bounds of A and B is less than or equal to the probability P identified by the user A 120A. Thus, whenever an measured power consumption value y' exceeds the threshold, an alert is triggered to signal that an unlikely event has occurred and may indicate a deviation from energy efficient operations of the technology component.

At step 665, the service provider server 240 may determine whether the current energy consumption value satisfies the threshold. For example, the current energy consumption value may satisfy the threshold if the current energy consumption value is within the upper and lower bounds of the threshold. If, at step 665, the service provider server 240 determines that the current energy consumption value satisfies the threshold, the service provider server 240 moves to step 680. At step 680, the service provider server 240 returns data indicating that the current energy consumption value satisfies the threshold. If, at step 665, the service provider server 240 determines that the current energy consumption value does not satisfy the threshold, the service provider server 240 moves to step 670. At step 670, the service provider server 240 returns data indicating that the current energy consumption value does not satisfy the threshold.

Figure 7:
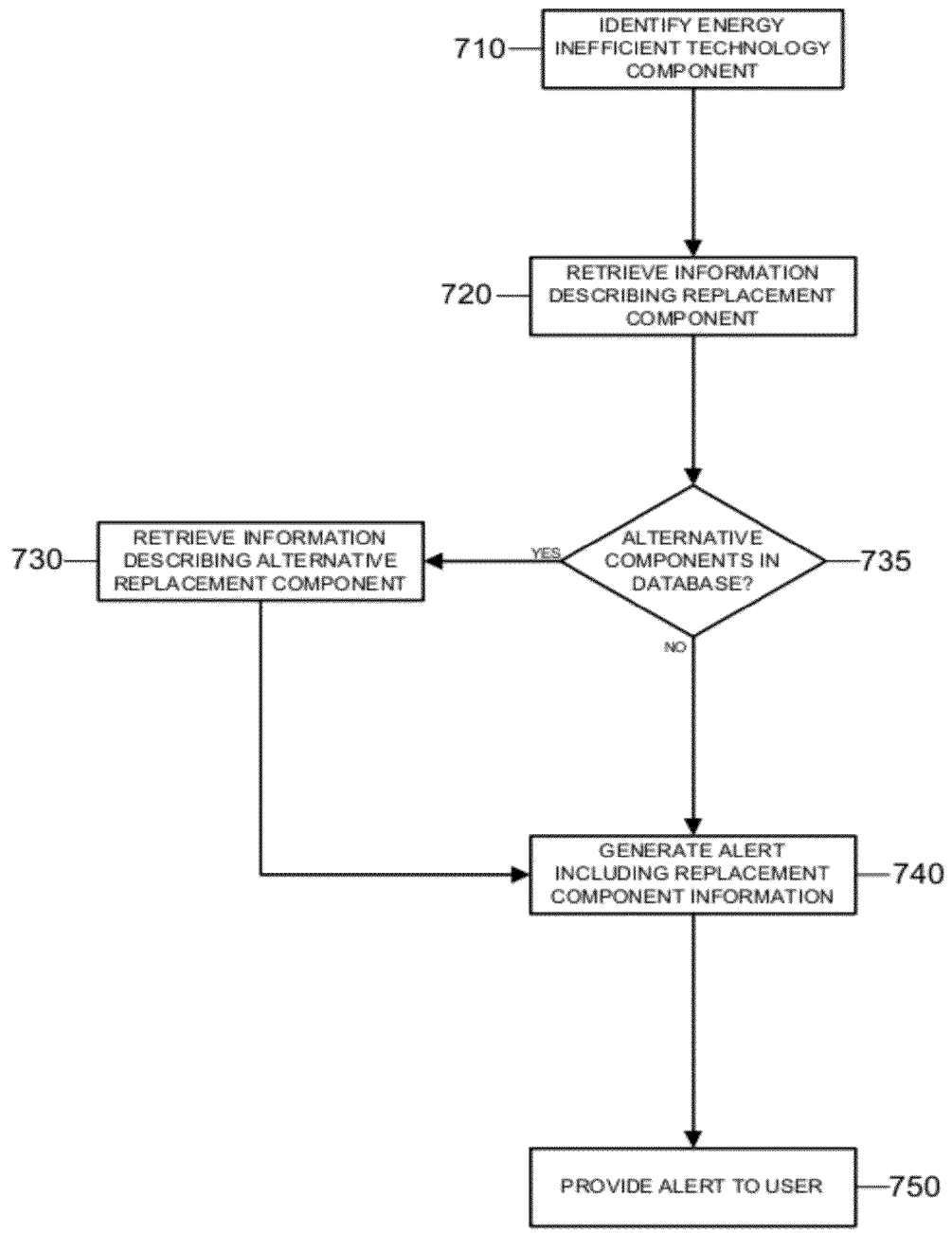
FIG. 7 is a flowchart illustrating the operations of alerting a user of a technology component operating in an energy inefficient manner in the system of FIG. 1, or other systems for assembling behavior models of technology components.

FIG. 7 is a flowchart illustrating the steps of alerting a user of a technology component operating in an energy inefficient manner in the system of FIG. 1, or other systems for assembling behavior models of technology components. The steps of FIG. 7 are described as being performed by the service provider server 240. However, the steps may be performed by a process running on the operating system of the service provider server 240, by the processor of the service provider server 240, or by any other hardware component of the service provider server 240. Alternatively the steps may be performed by an external hardware component or software process.

At step 710, the service provider server 240 identifies the technology component operating in an energy inefficient manner. At step 720, the service provider server 240, retrieves information from the data store 245 describing a replacement component for the component operating in an energy inefficient manner. The information may include the make, model number, price of the replacement, and a network identifier of a web site for ordering the replacement component. At step 725, the service provider server 240 may determine whether the data store 245 contains any alternative technology components which can be used in place of the technology component operating in an energy inefficient manner. The service provider server 240 may determine whether any available alternative technology components are capable of operating in a more energy efficient manner the current component.

If, at step 725, the service provider server 240 identifies an alternative component in the data store 245 offering better energy efficiency, the service provider server 240 moves to step 730. At step 730, the service provider server 240 retrieves information from the data store 245 describing the alternative replacement component, such as the make, model number, price, and a network identifier of a web site for ordering the alternative replacement component.

If, at step 725, the service provider server 240 does not identify an alternative replacement component capable of better energy efficiency, the service provider server 240 moves tot step 740. At step 740, the service provider server 240 generates the data for the alert including the replacement component information and any identified alternative replacement component information. The alert may further include information describing the current energy consumption of the technology component and a description of potential causes for the technology component operating in an energy inefficient manner. For example, if the power consumption of the technology component is zero, then the technology component may have completely failed. In another example, if the technology component is old and only slightly deviating from the threshold, the description may indicate that the technology is old and in need of replacement.

Alternatively or in addition, the service provider server 240 may categorize the alerts based on the importance of replacing the technology component operating in an energy inefficient manner. The alerts may be sent and/or displayed according to an importance level of repairing and/or replacing the technology component operating in an energy inefficient manner. For example, if the technology component failed completely, and the technology component is critical to the operations of the data center and/or workplace, the alert may be sent and/or displayed according to a high importance level. Alternatively or in addition, if the component is not critical to the operations and is only slightly deviating from the baseline power consumption value, the alert may be sent and/or displayed according to a lower importance level. For example, an alert sent in accordance with a high importance level may be sent directly to the administrator 110 and/or may be displayed to the user A 120A in a manner which emphasizes the high importance level, such as red colored text.

At step 750, the service provider 240 provides the alert to the user A 120A, and/or the administrator 110. The alert may be provided to the user A 110A and/or the administrator 110 through one or more of an email, an SMS message, a voicemail, an instant message, or generally any method of communicating over the network 230. Alternatively or in addition, the service provider server 240 may only send the alert to the administrator 110 when the importance of the alert meets an importance threshold, such as an alert of high importance. Alternatively or in addition, the service provider server 240 may determine the method of communicating the alert based on the importance of the alert. For example, an alert with a high importance level may be communicated to the administrator 110 by dialing the home phone number or mobile phone number of the administrator 110 and playing a message describing the alert, while an alert with a low importance level may be sent by email to the user A 120A.

Figure 8:
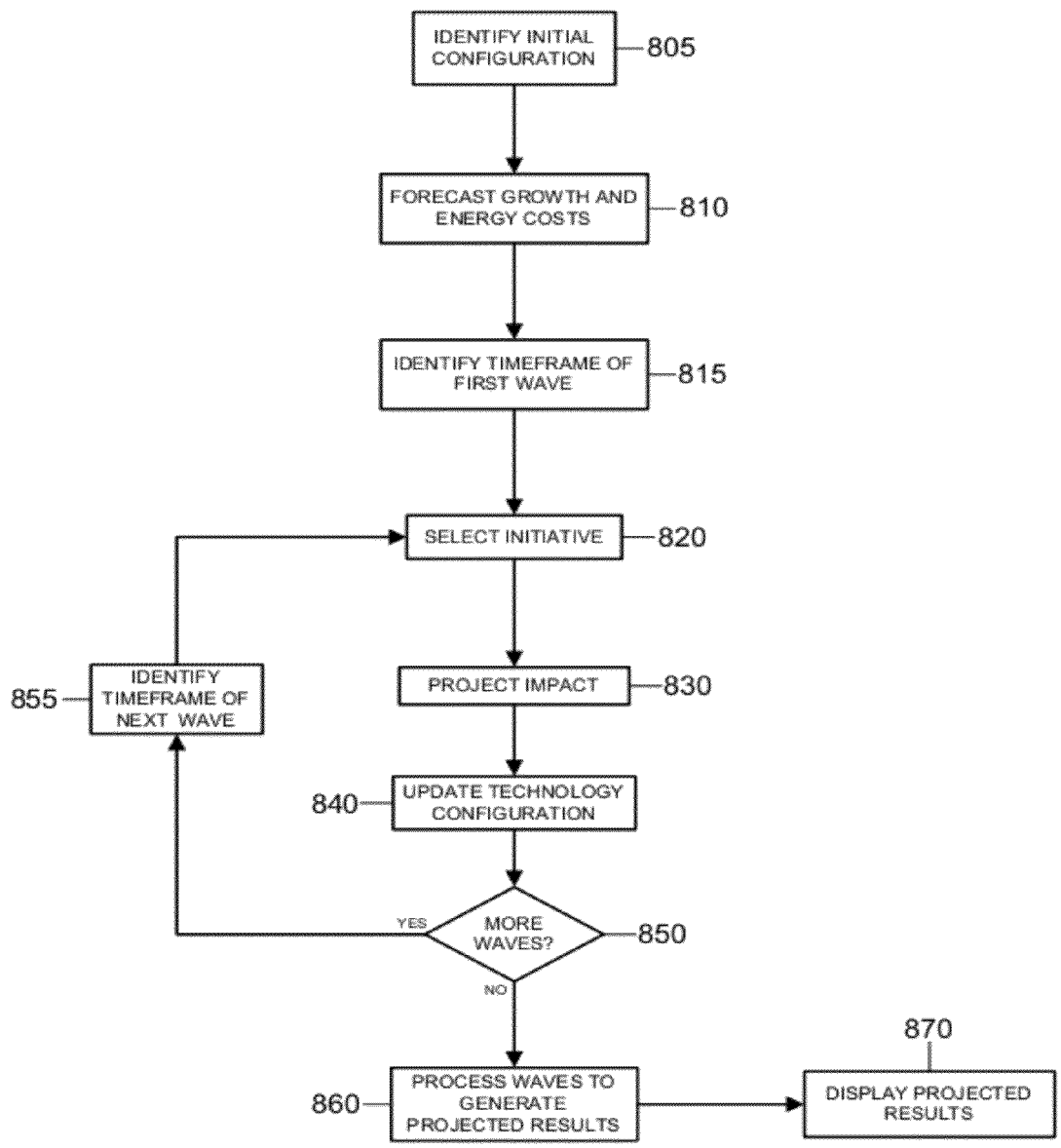
FIG. 8 is a flowchart illustrating the operations of processing multiple implementation waves in the system of FIG. 1, or other systems for assembling behavior models of technology components.

FIG. 8 is a flowchart illustrating the steps of processing multiple implementation waves in the system of FIG. 1, or other systems for assembling behavior models of technology components. The steps of FIG. 8 are described as being performed by the service provider server 240. However, the steps may be performed by a process running on the operating system of the service provider server 240, by the processor of the service provider server 240, or by any other hardware component of the service provider server 240. Alternatively the steps may be performed by an external hardware component or software process.

The user A 120A may use multiple implementation waves to forecast the cumulative effects of multiple energy saving strategies applied to a workplace and/or data center in serial or in parallel over a period of time. At step 805, the user A 120A may identify the initial technology configuration and profile of a workplace and/or data center. The technology configuration may be a general description using average values to describe the technology components, or a detailed description capturing the baseline power consumption models of the actual technology components used in the workplace and/or data center. The profile of the workplace and/or data center may include the location, the number of employees, and an industry associated with the workplace and/or data center, or generally any data that might affect the energy consumption of the workplace and/or data center. Alternatively or in addition the user A 120A may provide a data file, such as a MICROSOFT EXCEL file, an extensible markup language (XML) file, or generally any data file, with an initial technology configuration to the service provider server 240. The service provider server 240 may process the file and load the values of the file into the data store 245.

At step 810, the user A 120A may provide an initial energy cost forecast, and tons of carbon generated per kilowatt of energy consumed forecast. The user A 120A may create one or more trends with the one or more sets of forecasted values. The service provider server 240 may display a visual representation of the projected energy costs and carbon emissions of the initial technology configuration based on the forecasts of the user A 120A and the power consumption models of each technology component in the technology configuration.

The service provider server 240 may also provide the user A 120A with expert suggestions for the forecasts, such as expert predictions of the increase in the cost of electricity or expert predictions of the tons of carbon generated per kilowatt hour of energy consumed. The expert predictions may be retrieved from government reports, such as reports including data and analysis conducted by government agencies. Alternatively or in addition the expert predictions may be retrieved from industry experts, such as experts who may provide their predictions for the forecasts which may affect their business. The industry experts may be vendors and/or analysts, such as GARDNER, IDC, and/or FORRESTER. Alternatively or in addition the expert predictions may be retrieved from ACCENTURE experts who may create their own pre-configured projects to make the knowledge available to the users 120A-N.

At step 815, the user A 120A may identify the timeframe for implementing the first strategy. The service provider server 240 may use the timeframe to determine the projected energy needs and costs of operating the workplace and/or data center. At step 820, the user A 120A may select a strategy for the current timeframe. If the user A 120A selects more than one strategy the service provider server 240 may suggest an order in which the strategies should be implemented. The order may be optimized relative to the forecasts for the energy costs and the carbon emissions per kWh, or other factors. A method for determining the optimum order may be to compute the energy savings achievable for all possible arrangements of the strategies and provide the order of the strategies capable of achieving the greatest energy savings to the user A 120A.

At step 830, the service provider server 240 may project the impact of implementing the selected initiative to the workplace. The projection may account for all forecasted values, such as energy costs and the amount of carbon generated per kilowatt of energy consumed. The projection may utilize the baseline power consumption models of the technology components in the technology configuration. The service provider server 240 may suggest a technology configuration best suited to implement the selected strategy.

Alternatively or in addition the system 100 may allow the user A 120A to view real-time estimates showing relevant planning metrics as the user A 120A selects initiatives and/or updates their technology configuration. The metrics may include the energy use in kWh, the carbon footprint, the implementation and operation cost, or generally any metric that may be of interest to the user A 120A. The metrics may be determined using the baseline power consumption models of the technology components.

At step 840, the user A 120A may update the technology configuration data with the technology configuration suggested by the service provider server 240. Alternatively or in addition the user A 120A may disregard the suggestion of the service provider server 240 and update the technology configuration data based on their own assessment. At step 850, the user A 120A may identify whether they wish to plan more waves of energy savings strategies. If, at step 850, the user A 120A wishes to plan out another wave, the system 100 moves to step 855, otherwise the service provider server 240 moves to step 860. At step 855, the user A 120A may identify the timeframe of the next wave and then the service provider server 240 may move to step 820.

At step 860, the service provider server 240 may process all the waves created by the user A 120A to generate the projected aggregate results of the waves on the carbon emissions, electricity cost, operating cost, and energy use of the workplace and/or data center. The service provider server 240 may use the baseline power consumption models for the technology components when generating the projected aggregate results of the waves on the carbon emissions, electricity cost, operating cost, and energy use. The service provider server 240 may generate one or more graphs showing the projected values of these values over the course of the planned timeframe.

If the user A 120A has identified multiple strategies per wave and an order of the strategies within the waves, the service provider server 240 may provide a schedule of planned implementation dates of the wave plans. Alternatively or in addition the user A 120A may manually specify the timing of the wave deployment. The schedule may be optimized relative to the forecasts for electricity cost, carbon emissions per kWh, or other factors. The order of deployment may also be optimized based on operational expenses, capital expenses, or other measures. For example, to minimize capital expenditures ("CAPEX"), the service provider server 240 may suggest timing of initiatives in a manner that leverages the savings garnered from the previous waves to finance the cost of later waves. This may require the forecasted cost of the electricity as an input. Alternatively or in addition, to lower operational expenditure ("OPEX") constraint to an annual budget, the service provider server 240 may suggest a timing of initiatives to coincide with changes in energy prices.

At step 870, the service provider server 240 may display the graphs and projected results to the user A 120A via the web application 220A. The service provider server 240 may also provide the user A 120A with a rating and assessment of their workplace strategy. The rating may be based on the strategies and energy savings achieved by other organizations.

Alternatively or in addition the service provider server 240 may allow the user A 120A to create multiple workplace and/or data center instances, or multiple profiles, for the same workplace and/or data center. The multiple instances may allow the user A 120A to compare the effects of different strategies and/or forecast values on a workplace. For each instance the user A 120A may specify separate headcounts, strategies, waves, or generally any data associated with the workplace and or data center.

The user A 120A may be able to manage the strategy planning across multiple workplaces and/or data centers so as to ensure that the entire organizational energy savings strategy is optimized. The system 100 may allow the user A 120A to view the current or initial configuration of the workplaces and/or data centers, as well as view the projections of their planned changes across all of the workplaces and/or data centers.

Figure 9:
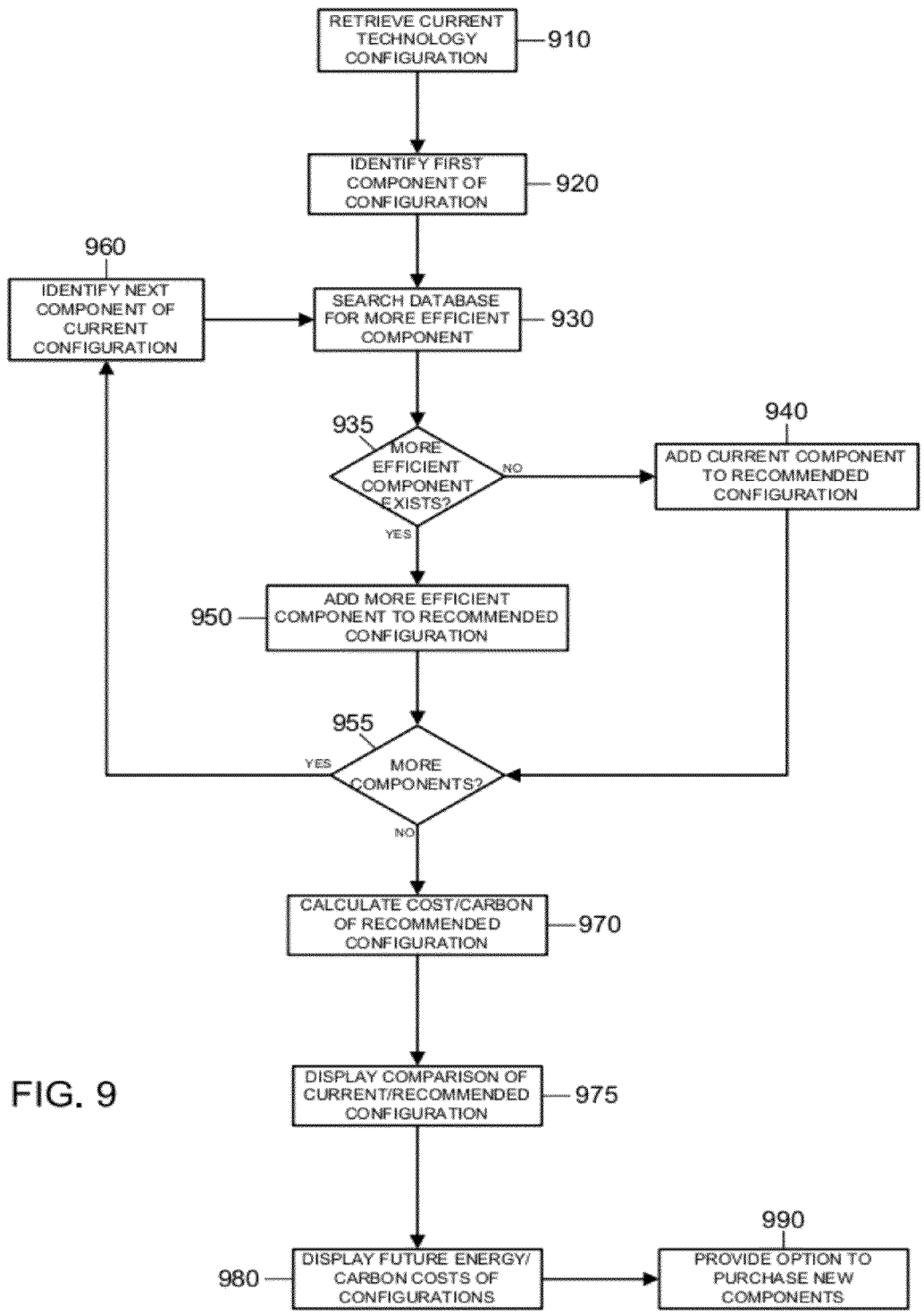
FIG. 9 is a flowchart illustrating the operations of recommending an energy efficient technology configuration in the system of FIG. 1, or other systems for assembling behavior models of technology components.

FIG. 9 is a flowchart illustrating the steps of recommending an energy efficient technology configuration in the system of FIG. 1, or other systems for assembling behavior models of technology components. The steps of FIG. 9 are described as being performed by the service provider server 240. However, the steps may be performed by a process running on the operating system of the service provider server 240, by the processor of the service provider server 240, or by any other hardware component of the service provider server 240. Alternatively the steps may be performed by an external hardware component or software process.

At step 910, the service provider server 240 may retrieve the current technology configuration data of the user A 120A. The configuration data may include the initial and/or current technology component inventory of the user A 120A. The inventory data may include specific make and model numbers of the technology components used by the organization.

At step 920, the service provider server 240 may identify the first technology component of the organization, such as a monitor. At step 930, the service provider server 240 may search the data store 245 for a component that is more efficient, either cost-wise, power-consumption wise, or carbon emissions-wise, than the component currently used by the organization. For example, the service provider server 240 may identify a monitor that has a baseline power consumption model which is more energy efficient than the baseline power consumption model of the monitor currently used by the organization. Alternatively or in addition, the service provider server 240 may attempt to convert multiple technology components into more efficient components, such as converting laptop and desktop computers to a thin client infrastructure. At step 935, the service provider server 240 may determine whether a more efficient component exists, capable of replacing one or more components in the current technology configuration of the organization.

If, at step 935, the service provider server 240 determines that a more efficient component exists, the service provider server 240 may move to step 950. At step 950, the service provider server 240 may add the more efficient component to a recommended technology configuration. If, at step 935, the service provider server 240 determines that a more efficient component does not exist, then the service provider server 240 may move to step 940. At step 940, the service provider server 240 may add the current component to the recommended technology configuration. At step 955, the service provider server 240 may determine whether there are additional technology components to analyze in the technology configuration. If, at step 955, the service provider server 240 determines there are additional technology components to analyze, then the service provider server 240 may move to step 960. At step 960, the service provider server 240 may identify the next component to analyze and may repeat the steps of determining whether a more efficient component exists.

After analyzing each of the components in the technology configuration, and generating a recommended technology configuration, the service provider server 240 may move to step 970. At step 970, the service provider server 240 may determine the cost of the recommended technology configuration and the carbon output of the recommended technology configuration. If the recommended technology configuration is identical to the initial technology configuration of the user A 120A then the service provider 140 may report to the user A 120A that there are no optimizations to their technology configuration.

At step 970, the service provider server 240 may display a comparison of the current technology configuration and the recommended technology configuration to the user A 120A via the web application 220A. The comparison may display to the user A 120A the annual costs and the annual carbon emissions achieved by the current technology configuration of the user A 120A, and those achieved by the recommended technology configuration. The annual costs and the annual carbon emissions may be determined using the baseline power consumption models for the technology components in the current technology configuration and the technology components in the recommended technology configuration. At step 980, the service provider server 240 may display a forecast of the future energy and cost savings achievable by the recommended technology configuration over the initial technology configuration of the user A 120A. At step 990, the service provider server 240 may offer the user A 120A the option to purchase the technology components necessary to convert their current technology configuration to the recommended technology configuration. The service provider server 240 may sell the equipment directly to the user A 120A or the service provider server 240 may refer the user A 120A to a retailer. If the service provider server 240 refers the user A 120A to a retailer, the service provider 140 may receive a referral fee or a percentage of any purchases made by the user A 120A.

Figure 10:
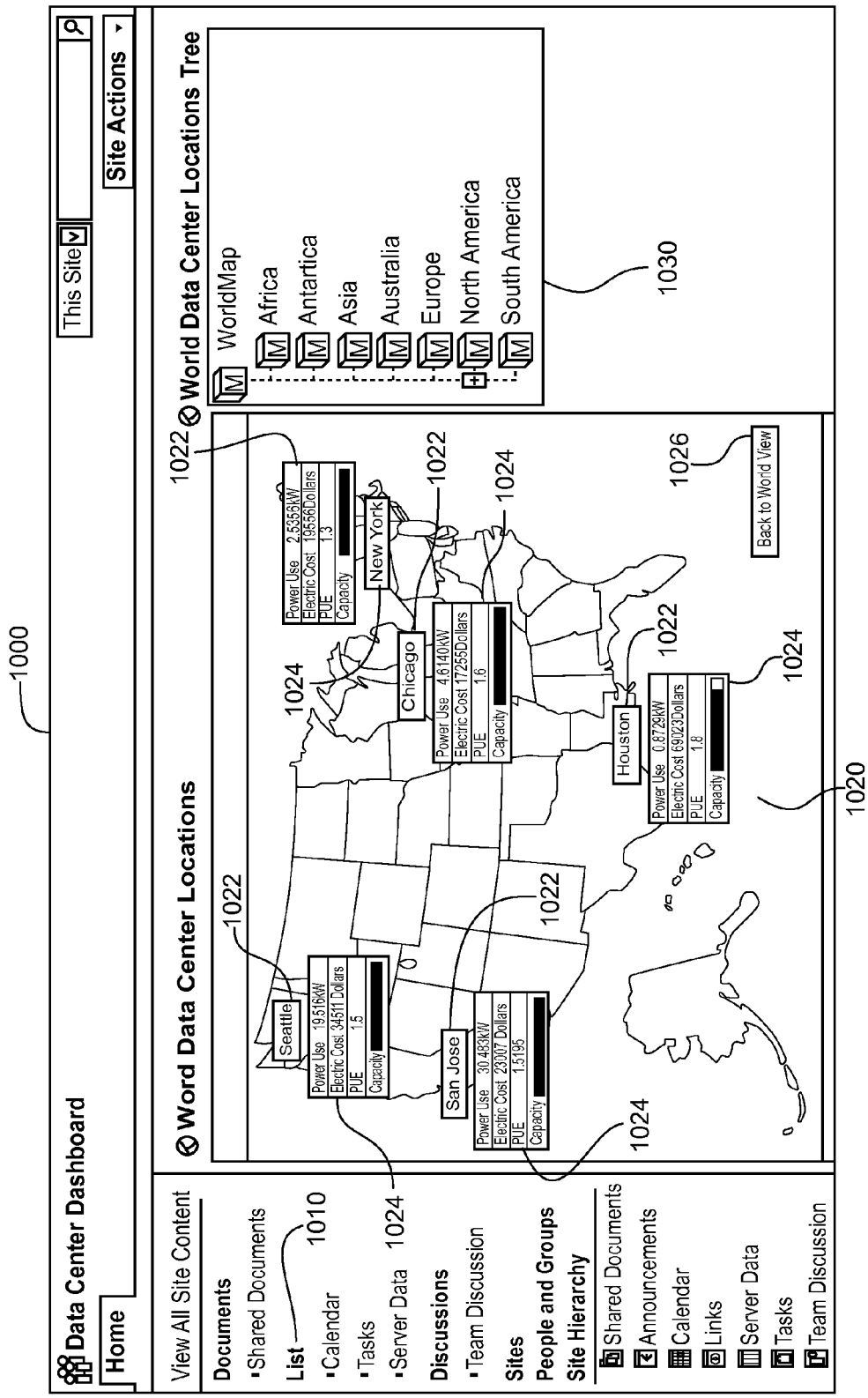
FIG. 10 is a screenshot of a user interface for viewing an overview of an organization's energy consumption in the system of FIG. 1, or other systems for assembling behavior models of technology components.

FIG. 10 is a screenshot of a user interface 1000 for viewing an overview of an organization's energy consumption in the system of FIG. 1, or other systems for assembling behavior models of technology components. The user interface 1000 may include a document subsection 1010, a map subsection 1020, and a navigation subsection 1030. The document subsection 1010 may provide the user A 120A with links to documents relevant to the user interface 1000. The map subsection 1020 may display the locations of one or more workplaces and/or data centers of the organization. The locations may include location descriptions 1024 and location buttons 1022. The navigation subsection 1030 may allow the user A 120A to view and navigate to different locations of the organization's data centers and/or workplaces.

In operation, the user A 120A may view the organization's data centers and/or workplaces that are located within the geographic region displayed in the map subsection 1020. The user A 120A may click on a different geographic region in the navigation subsection 1030 to view a different geographic region in the map subsection 1030. The location descriptions 1024 may include information describing a data center and/or workplace. The location descriptions 1024 may include the power use of the location, the electricity cost of the location, the power usage effectiveness (PUE) of the location and the capacity of the location. The location descriptions 1024 may also include a visual indicator and/or audio indicator to indicate that a technology component located at the location is operating in an energy inefficient manner. The visual indicator may include a change in the fonts, colors, or size of the text, or may include a graphical icon, such as an exclamation point. Generally the visual indicator may include any graphical indication capable of causing the location description 1024 to capture the attention of the user A 120A. The audio indicator may include an audio beep, or generally any sound which may capture the attention of the user A 120A. The user A 120A may click on the location button 1022 for a more detailed view of the data center and/or workplace, such as the view provided by the user interface 1100.

Figure 11:
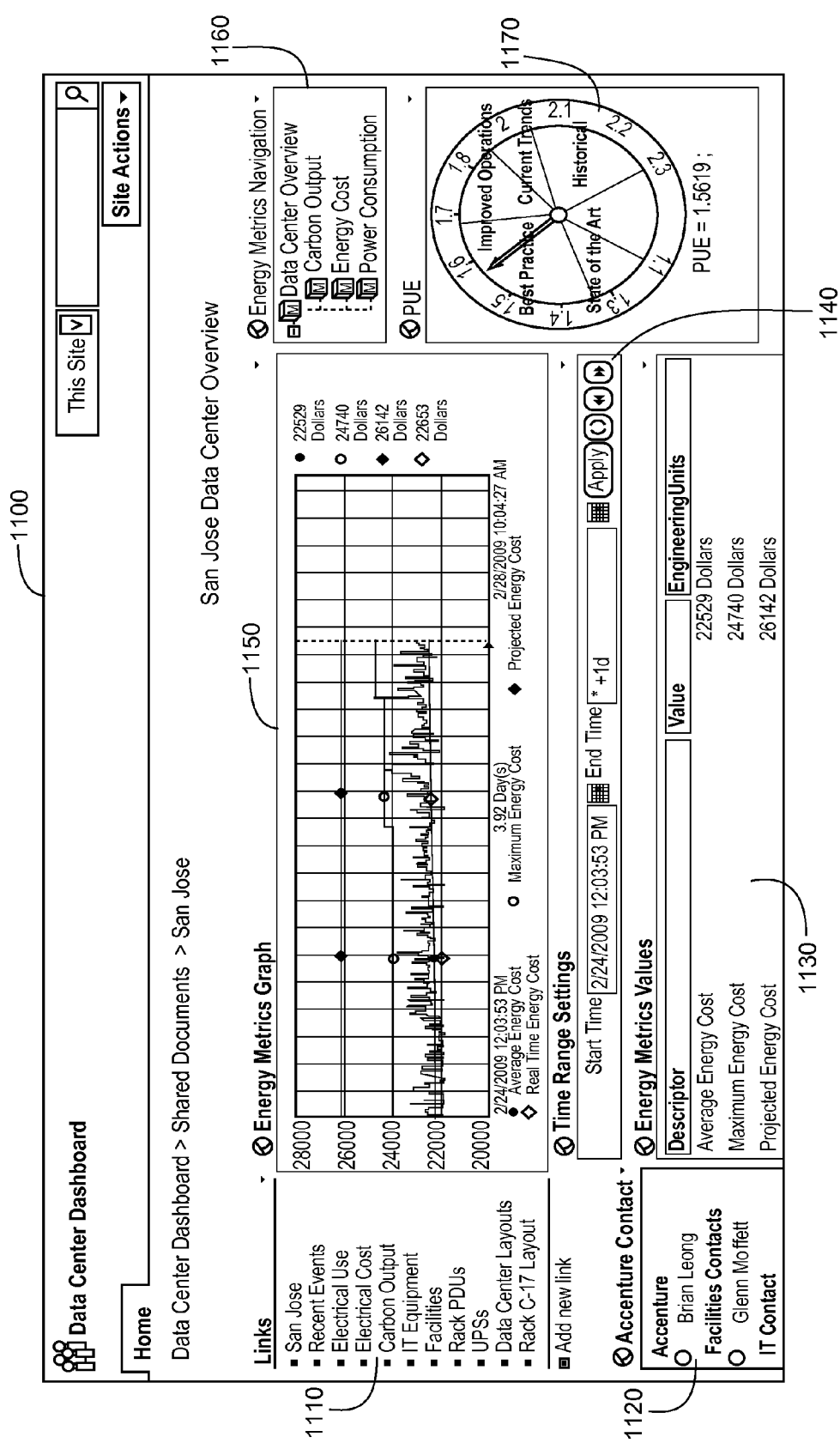
FIG. 11 is a screenshot of a user interface for viewing the energy consumption data of an organization's data center in the system of FIG. 1, or other systems for assembling behavior models of technology components.

FIG. 11 is a screenshot of a user interface 1100 for viewing the energy consumption data of an organization's data center in the system of FIG. 1, or other systems for assembling behavior models of technology components. The user interface 1100 may include a link subsection 1110, a contact subsection 1120, a metric subsection 1130, a date range subsection 1140, a graph subsection 1150, a navigation subsection 1160, and a PUE subsection 1170. The links subsection 1110 may display links relevant to the user interface 1100. The contact subsection 1120 may display contact information relevant to the user interface 1100, such as contact information of the administrator 110. The metric subsection 1130 may display metric information relating to the data center and/or workplace. For example, the metric subsection 1130 may display power allocation, in absolute numbers and/or in percentages, the overall PUE, the average, peak, and real-time power consumption, the average, peak, and real-time carbon footprint, and the power, cooling and heating capacities and costs. The date range subsection 1140 may allow a user A 120A to change the date range of the data displayed in the metric subsection 1130. The graph subsection 1150 may provide a graphical display of the data displayed in the metric subsection 1130. The navigation subsection 1160 may allow a user A 120A to navigate to user interfaces for viewing additional metrics, such as carbon output, energy cost, and power consumption. The PUE subsection 1170, may provide a graphical display of the PUE of the location.

The user interface 1100 may also include an alert subsection which may display any alerts associated with a technology component located within the data center and/or workplace represented by the user interface 1100. For example, if a technology component located within the data center is operating in an energy inefficient manner, the user interface 1100 may include an alert to notify the user A 120A of the technology component.

Figure 12:
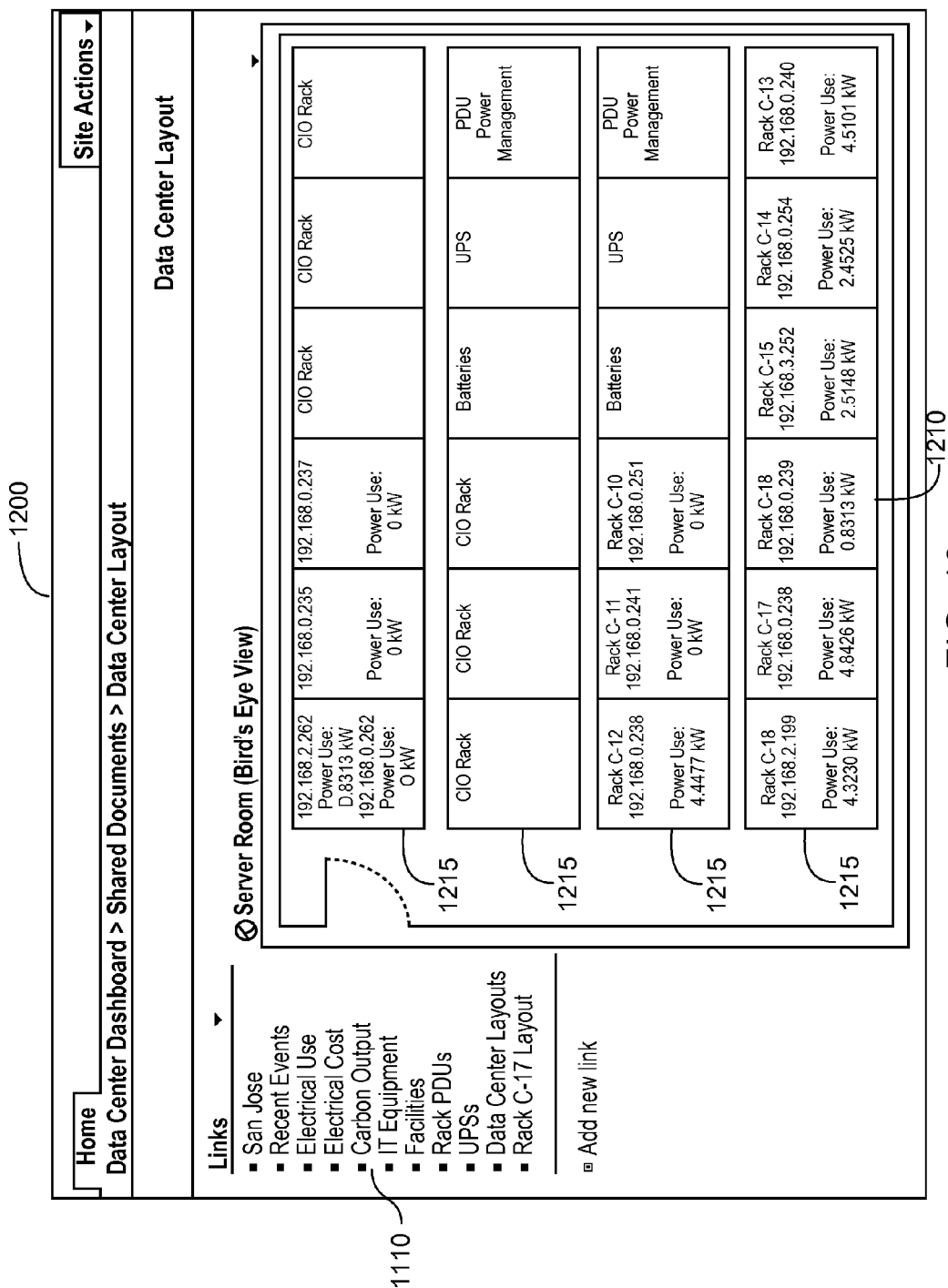
FIG. 12 is a screenshot of a user interface for viewing the layout of an organization's data center in the system of FIG. 1, or other systems for assembling behavior models of technology components.

FIG. 12 is a screenshot of a user interface 1200 for viewing the layout of an organization's data center in the system of FIG. 1, or other systems for assembling behavior models of technology components. The user interface 1200 may include a link subsection 1110, and a layout subsection 1210. The layout subsection may include one or more racks 1215. The racks 1215 may display an identifier of the rack, such as a name of the rack, a network identifier associated with the rack, such as an internet protocol (IP) address, and the power usage of the rack. The user interface 1200 may also identify where the cold aisles are located in the layout, and display the temperature and humidity of each cold aisle. The user interface 1200 may also display the power allocation by row and the power, cooling, and heating capacity by row. If a technology component located within one of the racks is operating in an energy inefficient manner, the rack 1215 containing the technology component may include a visual indicator to indicate that a technology component within the rack requires attention. For example, the visual indicator may be a flashing red indicator, or a yellow exclamation point, or generally any indicator capable of capturing the attention of the user A 120A.

Alternatively or in addition, if the data center and/or workplace are shared by multiple organizations or multiple departments of an organization, the service provider server 240 may also provide the user A 120A with user interfaces for viewing the power, cooling, and heating allocation per department or organization, in absolute numbers and/or in percentages. The user interfaces may also display the cost of power, cooling, and heating per department or organization.

Figure 13:
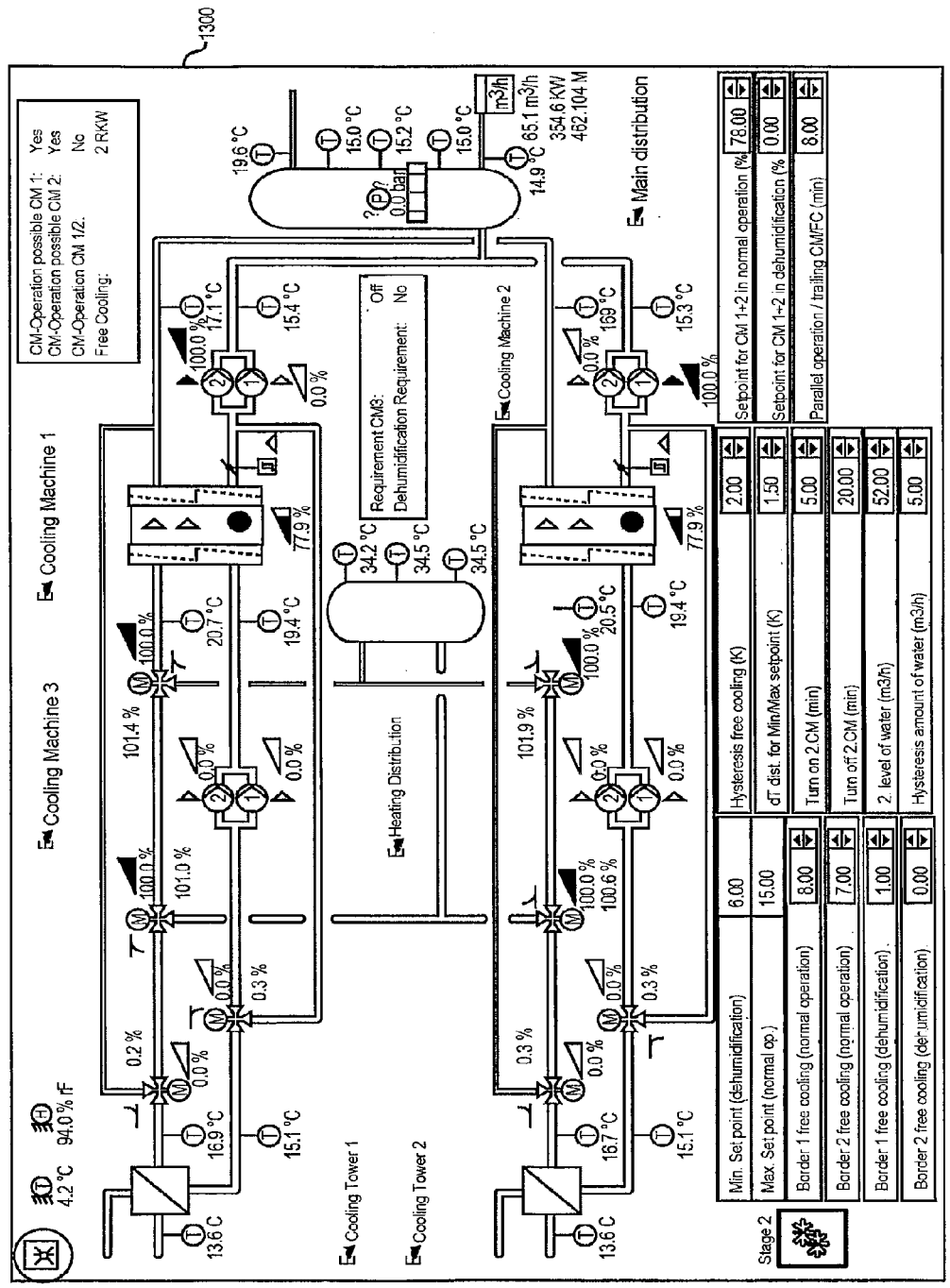
FIG. 13 is a screenshot of a user interface for viewing the cooling layout of an organization's data center in the system of FIG. 1, or other systems for assembling behavior models of technology components.

FIG. 13 is a screenshot of a user interface 1300 for viewing the cooling layout of an organization's data center in the system of FIG. 1, or other systems for assembling behavior models of technology components. The user interface 1300 may display the utilization, on/off status and alerts for each technology component represented in the cooling layout. The alerts may be displayed with a visual indicator to indicate that the technology component with an alert that indicates to the user A 120A and/or a computer processor that immediate attention is required. The user A 120A may click on the technology component to view the details of the alert. The user interface 1300 may also display the overall power consumed versus the overall cooling delivered for each technology component represented in the cooling layout. The user interface 1300 may provide the user A 120A with insight into when to turn the cooling units on and/or off.

The user interface 1300 may allow the user A 120A to view the upper and lower temperature bounds for each of the technology components displayed in the user interface 1300. The user interface 1300 may also allow the user A 120A to modify the thresholds associated with each of the technology components and/or to modify the upper and lower bounds associated with each of the technology components. The user interface 1300 may display audio and/or visual alerts when the monitored values of the technology components are outside of the threshold. For example, the user interface 1300 may display an alert message on the screen. The color, text size and font of the alert message may be changed to emphasize the message to the user A 120A. Alternatively or in addition, the location of the message on the user interface 1300 may change to emphasize the message to the user A 120A. For example, the alert message may be displayed on the center of the user interface 1300 to emphasize the message to the user A 120A. Alternatively or in addition, and audio alert may be played to the user A 120A, such as a beep or any other sound which may capture the attention of the user A 120A.

Alternatively or in addition, the service provider server 240 may also provide the user A 120A with user interfaces for viewing the power layout of a data center and/or workplace. The power layout may display the utilization, on/off status and alerts for each technology component represented in the power layout. The power layout may also display the overall power consumed versus the overall power delivered for each device, and the corresponding efficiency rating.

Alternatively or in addition, if the data center and/or workplace utilize heating, the service provider server 240 may provide a user interface for displaying a heating layout of the data center and/or workplace. The heating layout the may display the utilization, on/off status and alerts for each technology component represented in the heating layout. The heating layout may also display the overall power consumed versus the overall heating delivered for each device, and the corresponding efficiency rating. The heating layout may provide the user A 120A with insight into when the heating units should be turned on and/or off.

FIG. 14 illustrates a general computer system 1400, which may represent a service provider server 240, or any of the other computing devices referenced herein. The computer system 1400 may include a set of instructions 1424 that may be executed to cause the computer system 1400 to perform any one or more of the methods or computer based functions disclosed herein. The computer system 1400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1424 (sequential or otherwise) that specify actions to be taken by that machine. In a particular embodiment, the computer system 1400 may be implemented using electronic devices that provide voice, video or data communication. Further, while a single computer system 1400 may be illustrated, the term "system" shall also be taken to include any collection of systems or subsystems that individually or jointly execute a set, or multiple sets, of instructions to perform one or more computer functions.

As illustrated in FIG. 14, the computer system 1400 may include a processor 1402, such as, a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404 that can communicate via a bus 1408. The memory 1404 may be a main memory, a static memory, or a dynamic memory. The memory 1404 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1404 may include a cache or random access memory for the processor 1402. Alternatively or in addition, the memory 1404 may be separate from the processor 1402, such as a cache memory of a processor, the system memory, or other memory. The memory 1404 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1404 may be operable to store instructions 1424 executable by the processor 1402. The functions, acts or tasks illustrated in the figures or described herein may be performed by the programmed processor 1402 executing the instructions 1424 stored in the memory 1404. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 1400 may further include a display 1414, such as a liquid crystal display (LCD), an organic light emitting diode (OLED), a flat panel display, a solid state display, a cathode ray tube (CRT), a projector, a printer or other now known or later developed display device for outputting determined information. The display 1414 may act as an interface for the user to see the functioning of the processor 1402, or specifically as an interface with the software stored in the memory 1404 or in the drive unit 1406.

Additionally, the computer system 1400 may include an input device 1412 configured to allow a user to interact with any of the components of system 1400. The input device 1412 may be a number pad, a keyboard, or a cursor control device, such as a mouse, or a joystick, touch screen display, remote control or any other device operative to interact with the system 1400.

The computer system 1400 may also include a disk or optical drive unit 1406. The disk drive unit 1406 may include a computer-readable medium 1422 in which one or more sets of instructions 1424, e.g. software, can be embedded. Further, the instructions 1424 may perform one or more of the methods or logic as described herein. The instructions 1424 may reside completely, or at least partially, within the memory 1404 and/or within the processor 1402 during execution by the computer system 1400. The memory 1404 and the processor 1402 also may include computer-readable media as discussed above.

The present disclosure contemplates a computer-readable medium 1422 that includes instructions 1424 or receives and executes instructions 1424 responsive to a propagated signal; so that a device connected to a network 235 may communicate voice, video, audio, images or any other data over the network 235. Further, the instructions 1424 may be transmitted or received over the network 235 via a communication interface 1418. The communication interface 1418 may be a part of the processor 1402 or may be a separate component. The communication interface 1418 may be created in software or may be a physical connection in hardware. The communication interface 1418 may be configured to connect with a network 235, external media, the display 1414, or any other components in system 1400, or combinations thereof. The connection with the network 235 may be a physical connection, such as a wired Ethernet connection or may be established wirelessly as discussed below. Likewise, the additional connections with other components of the system 1400 may be physical connections or may be established wirelessly. In the case of a service provider server 240 or the content provider servers 110A-N, the servers may communicate with users 120A-N through the communication interface 1418.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1422 may be a single medium, or the computer-readable medium 1422 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1422 may include a solid-state memory such as a memory card or other package that houses one or more non-volatile read-only memories. The computer-readable medium 1422 also may be a random access memory or other volatile re-writable memory. Additionally, the computer-readable medium 1422 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for assembling a behavior model of a technology component, the method comprising:
    monitoring, by the processor, a technology component over a period of time during each state of a plurality of states to determine a plurality of parameter values associated with each state of the plurality of states of the technology component, where the plurality of states comprises an online state, an offline state and a startup state;
    processing, by the processor, the plurality of parameter values associated with each state in the plurality of states to determine a baseline parameter value for each state in the plurality of states;
    assembling, by the processor, a behavior model for the technology component, wherein the behavior model comprises each state, the baseline parameter value for each state, and an association between each state and the baseline parameter value for each state;
    storing, by the processor in a data store, the behavior model of the technology component; and
    wherein the technology component operates in the online state at a utilization value in a plurality of utilization values.

2. The method of claim 1 further comprising:
    monitoring, by the processor, the technology component to determine a current state of the technology component and a current parameter value of the technology component;
    retrieving, by the processor, the behavior model of the technology component from the data store;
    inputting, by the processor, the current operating state to the behavior model to retrieve the baseline parameter value associated with the current operating state;
    determining, by the processor, whether the current parameter value of the technology component is within a threshold of the baseline parameter value; and
    providing, by the processor, an alert to a device of a user if the current parameter value of the technology component is not within the threshold of the baseline parameter value.

3. The method of claim 2 wherein the current parameter value comprises at least one of a current power consumption value or a current temperature value of the technology component.

4. The method of claim 1 wherein processing, by the processor, the plurality of parameter values associated with each state further comprises, determining, by the processor, a smoothed average of the plurality of parameter values of each state in the plurality of states to determine the baseline parameter value for each state.

5. A computer-implemented method for assembling a baseline power consumption model of a technology component, the method comprising:
    monitoring, by a processor, a technology component over a period of time during each state of a plurality of states to determine a plurality of power consumption values associated with the technology component operating in each state of the plurality of states, where the plurality of states comprises an online state, an offline state and a startup state;
    processing, by the processor, the plurality of power consumption values associated with each state in the plurality of states to determine a baseline power consumption value for each state in the plurality of states;
    assembling, by the processor, a baseline power consumption model for the technology component, wherein the baseline power consumption model comprises each state, the baseline power consumption value for each state, and an association between each state and the baseline power consumption value for each state;
    storing, by the processor in a data store, the baseline power consumption model of the technology component; and
    wherein the technology component operates in the online state at a utilization value in a plurality of utilization values.

6. The method of claim 5 wherein processing, by the processor, the plurality of power consumption values associated with each state further comprises, determining, by the processor, a smoothed average of the plurality of power consumption values of each state in the plurality of states to determine the baseline power consumption value for each state.

7. The method of claim 5 further comprising:
monitoring, by the processor, the technology component to determine a current power consumption value and a current operating state of the technology component;
retrieving, by the processor, the baseline power consumption model of the technology component from the data store;
inputting, by the processor, the current operating state to the baseline power consumption model to retrieve the baseline power consumption value associated with the current operating state;
determining, by the processor, whether the current power consumption value is within a threshold of the baseline power consumption value; and
providing, by the processor, an alert to a device of a user if the current power consumption value of the technology component is not within the threshold of the baseline power consumption value.

8. The method of claim 5 wherein the plurality of utilization values represent a percentage of a resource of the technology component which is in operation.

9. The method of claim 8 wherein the resource of the technology component comprises at least one of a memory resource or a central processing unit resource.

10. The method of claim 5 further comprising:
monitoring, by the processor, the technology component over the period of time to determine a plurality of power consumption values associated with the technology component operating at each utilization value in the plurality of utilization values;
processing, by the processor, the plurality of power consumption values associated with each utilization value in the plurality of utilization values to determine a baseline power consumption value for each utilization value of the plurality of utilization values; and
assembling, by the processor, the baseline power consumption model for the technology component, wherein the baseline power consumption model further comprises each utilization value, the baseline power consumption value for each utilization value, and an association between each utilization value and the baseline power consumption value for each state.

11. The method of claim 10 further comprising:
applying, by the processor, each utilization value and each baseline power consumption value to a curve fitting algorithm to generate a continuous representation of each baseline power consumption value as a function of each utilization value; and
assembling, by the processor, the baseline power consumption model for the technology component, wherein the baseline power consumption model further comprises the continuous representation of each baseline power consumption value as a function of each utilization value.

12. The method of claim 11 wherein the curve fitting algorithm comprises at least one of a Gauss-Newton algorithm or a linear least square method.

13. The method of claim 5 further comprising:
receiving, by the processor, an initial technology configuration of a data center, wherein the initial technology configuration comprises of a plurality of initial technology components each initial technology component being associated with a baseline power consumption model;
processing, by the processor, the baseline power consumption model of each initial technology component to generate an initial power consumption estimate of the data center over a period of time; and
providing, by the processor, a graph of the initial power consumption estimate of the data center over a period of time.

14. The method of claim 13 further comprising:
receiving, by the processor, an energy saving initiative and a reduction factor from a user, wherein the energy saving initiative provides a strategy for reducing the initial power consumption estimate of the data center by the reduction factor;
processing, by the processor, the initial technology configuration, the energy saving initiative, and the reduction factor to determine a recommended technology configuration capable of reducing the initial power consumption estimate by the reduction factor, wherein the recommended technology configuration comprises of a plurality of recommended technology components, each recommended technology component being associated with a baseline power consumption model;
determining, by the processor, a recommended power consumption estimate of the recommended technology configuration over the period of time based on the baseline power consumption model of each recommended technology component; and
providing, by the processor, a second graph displaying the initial power consumption estimate and the recommended power consumption estimate.

15. A system for assembling a behavior model of a technology component, the system comprising:
a memory to store a behavior model of a technology component; and
a processor operatively connected to the memory, the processor operative to:
monitor the technology component over a period of time during each state of a plurality of states to determine a plurality of parameter values associated with each state of the plurality of states of the technology component, where the plurality of states comprises an online state, an offline state and a startup state,
process the plurality of parameter values associated with each state in the plurality of states to determine a baseline parameter value for each state in the plurality of states, assemble the behavior model for the technology component, wherein the behavior model comprises each state, the baseline parameter value for each state, and an association between each state and the baseline parameter value for each state, and
store the behavior model of the technology component in the memory; and
wherein the technology component operates in the online state at a utilization value in a plurality of utilization values.

16. The system of claim 15 further comprising an interface operatively connected to the memory and the processor, and operative to communicate with a device of a user, wherein:
the processor is further operative to monitor the technology component to determine a current state of the technology component and a current parameter value of the technology component, retrieve the behavior model of the technology component from the data store, input the current operating state to the behavior model to retrieve the baseline parameter value associated with the current operating state, determine, whether the current parameter value of the technology component is within a threshold of the baseline parameter value, and provide an alert to the device of the user via the interface if the current parameter value of the technology component is not within the threshold of the baseline parameter value.

17. The system of claim 16 wherein the current parameter value comprises at least one of a current power consumption value or a current temperature value of the technology component.

18. The system of claim 15 wherein the processor is further operative to determine a smoothed average of the plurality of parameter values of each state in the plurality of states to determine the baseline parameter value for each state.

19. A computer-implemented method for assembling a baseline power consumption model of a technology component, the method comprising:
monitoring, by a processor, a technology component over a period of time to determine a plurality of power consumption values associated with the technology component operating in each state of a plurality of states, where the plurality of states comprises an online state, an offline state and a startup state;
processing, by the processor, the plurality of power consumption values associated with each state in the plurality of states to determine a baseline power consumption value for each state in the plurality of states;
assembling, by the processor, a baseline power consumption model for the technology component, wherein the baseline power consumption model comprises each state, the baseline power consumption value for each state, and an association between each state and the baseline power consumption value for each state;
storing, by the processor in a data store, the baseline power consumption model of the technology component;
receiving, by the processor, an initial technology configuration of a data center, wherein the initial technology configuration comprises of a plurality of initial technology components each initial technology component being associated with a baseline power consumption model;
processing, by the processor, the baseline power consumption model of each initial technology component to generate an initial power consumption estimate of the data center over a period of time; and
providing, by the processor, a graph of the initial power consumption estimate of the data center over a period of time.

20. The method of claim 19 further comprising:
receiving, by the processor, an energy saving initiative and a reduction factor from a user, wherein the energy saving initiative provides a strategy for reducing the initial power consumption estimate of the data center by the reduction factor;
processing, by the processor, the initial technology configuration, the energy saving initiative, and the reduction factor to determine a recommended technology configuration capable of reducing the initial power consumption estimate by the reduction factor, wherein the recommended technology configuration comprises of a plurality of recommended technology components, each recommended technology component being associated with a baseline power consumption model;
determining, by the processor, a recommended power consumption estimate of the recommended technology configuration over the period of time based on the baseline power consumption model of each recommended technology component; and providing, by the processor, a second graph displaying the initial power consumption estimate and the recommended power consumption estimate.

21. A system for assembling a baseline power consumption model of a technology component, the system comprising:
a memory to store a baseline power consumption model of a technology component; and
a processor operatively connected to the memory, the processor operative to:
monitor the technology component over a period of time to determine a plurality of power consumption values associated with each state of a plurality of states of the technology component, where the plurality of states comprises an online state, an offline state and a startup state,
process the plurality of power consumption values associated with each state in the plurality of states to determine a baseline power consumption value for each state in the plurality of states,
assemble the baseline power consumption model for the technology component, wherein the baseline power consumption model comprises each state, the baseline power consumption value for each state, and an association between each state and the baseline power consumption value for each state,
store the baseline power consumption model of the technology component in the memory,
receive an initial technology configuration of a data center, wherein the initial technology configuration comprises of a plurality of initial technology components each initial technology component being associated with a baseline power consumption model;
process the baseline power consumption model of each initial technology component to generate an initial power consumption estimate of the data center over a period of time; and
provide a graph of the initial power consumption estimate of the data center over a period of time.

22. The system of claim 21 wherein the processor is further operative to:
receive an energy saving initiative and a reduction factor from a user, wherein the energy saving initiative provides a strategy for reducing the initial power consumption estimate of the data center by the reduction factor;
process the initial technology configuration, the energy saving initiative, and the reduction factor to determine a recommended technology configuration capable of reducing the initial power consumption estimate by the reduction factor, wherein the recommended technology configuration comprises of a plurality of recommended technology components, each recommended technology component being associated with a baseline power consumption model;
determine a recommended power consumption estimate of the recommended technology configuration over the period of time based on the baseline power consumption model of each recommended technology component; and
provide a second graph displaying the initial power consumption estimate and the recommended power consumption estimate.

* * * * *

UNITED STATES PATENT AND TRADEMARK OFFICE
CERTIFICATE OF CORRECTION

PATENT NO. : 8,438,125 B2  
APPLICATION NO. : 12/416752  
DATED : May 7, 2013  
INVENTOR(S) : Teresa S. Tung et al.

Page 1 of 1

It is certified that error appears in the above-identified patent and that said Letters Patent is hereby corrected as shown below:

In the Specification

In column 18, line 2, after "may be set to" insert --0--.

Signed and Sealed this  
Seventh Day of January, 2014

Margaret A. Focarino  
*Commissioner for Patents of the United States Patent and Trademark Office*